US012627637B2

(12) United States Patent
Bradley et al.

(10) Patent No.: US 12,627,637 B2
(45) Date of Patent: May 12, 2026

(54) SECURE DEVICE TO DEVICE COMMUNICATION CHANNEL

(71) Applicant: Apple Inc., Cupertino, CA (US)

(72) Inventors: Bob Bradley, San Jose, CA (US);
Marc J. Krochmal, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 566 days.

(21) Appl. No.: 16/147,224

(22) Filed: Sep. 28, 2018

(65) Prior Publication Data

US 2019/0124049 A1 Apr. 25, 2019

Related U.S. Application Data

(60) Provisional application No. 62/575,373, filed on Oct. 21, 2017.

(51) Int. Cl.
*H04L 29/06* (2006.01)
*G06F 9/451* (2018.01)
(Continued)

(52) U.S. Cl.
CPC .......... *H04L 63/0428* (2013.01); *G06F 9/453* (2018.02); *G06F 21/6245* (2013.01);
(Continued)

(58) Field of Classification Search
CPC . G06F 9/453; G06F 21/6245; H04L 63/0428; H04L 63/164; H04L 12/2809;
(Continued)

(56) References Cited

U.S. PATENT DOCUMENTS

| 7,167,142 B2 | 1/2007 | Buckley |
| 7,936,736 B2 * | 5/2011 | Proctor, Jr. ............ G06Q 50/01 |
| | | 455/456.3 |

(Continued)

FOREIGN PATENT DOCUMENTS

| CN | 101449275 A | 6/2009 |
| CN | 105659521 | 6/2016 |

(Continued)

OTHER PUBLICATIONS

Nguyen, Xuan Thang, and Ryszard Kowalczyk. "An agent based qos conflict mediation framework for web services compositions." In 2006 IEEE/WIC/ACM International Conference on Intelligent Agent Technology, pp. 522-528. IEEE, 2006. (Year: 2006).*

(Continued)

*Primary Examiner* — Luu T Pham
*Assistant Examiner* — Walter J Malinowski
(74) *Attorney, Agent, or Firm* — BAKERHOSTETLER

(57) ABSTRACT

One embodiment provides a data processing system on a communal electronic device, the data processing system comprising a memory device to store instructions; one or more processors to execute the instructions stored on the memory device, the instructions to cause the one or more processors to provide a virtual assistant to receive commands at the communal electronic device, wherein the virtual assistant, via the one or more processors, is to receive a command at the communal electronic device; determine whether the command is to access personal data of a user associated with the communal electronic device; and in response to a determination that the command is to access personal data of the user, send a request to a personal electronic device of the user to process at least a portion of the command.

20 Claims, 16 Drawing Sheets

(51) Int. Cl.

| | |
|---|---|
| *G06F 21/62* | (2013.01) |
| *H04L 9/40* | (2022.01) |
| *H04L 12/28* | (2006.01) |
| *H04W 12/02* | (2009.01) |
| *H04W 12/08* | (2021.01) |
| *H04W 76/14* | (2018.01) |
| *H04W 4/80* | (2018.01) |
| *H04W 8/00* | (2009.01) |

(52) U.S. Cl.
CPC ........ *H04L 12/2809* (2013.01); *H04L 63/164* (2013.01); *H04W 12/02* (2013.01); *H04W 12/08* (2013.01); *H04W 76/14* (2018.02); *H04W 4/80* (2018.02); *H04W 8/005* (2013.01)

(58) Field of Classification Search
CPC ..... H04W 76/14; H04W 12/02; H04W 12/08; H04W 4/80; H04W 8/005
USPC ........................................................ 713/168
See application file for complete search history.

(56) References Cited

U.S. PATENT DOCUMENTS

| | | | |
|---|---|---|---|
| 8,121,136 B2 | 2/2012 | Atsati | |
| 8,606,372 B1* | 12/2013 | Harris | H02J 3/00 |
| | | | 700/7 |
| 8,654,936 B1 | 2/2014 | Eslambolchi et al. | |
| 9,053,124 B1* | 6/2015 | Dornquast | G06F 11/1453 |
| 9,100,828 B2 | 8/2015 | Dave et al. | |
| 9,262,612 B2 | 2/2016 | Cheyer | |
| 9,318,108 B2 | 4/2016 | Gruber | |
| 9,432,472 B2 | 8/2016 | Burger | |
| 9,547,963 B1 | 1/2017 | Trundle | |
| 9,614,690 B2 | 4/2017 | Ehsani et al. | |
| 9,641,954 B1 | 5/2017 | Typrin et al. | |
| 9,721,570 B1 | 8/2017 | Beal et al. | |
| 9,820,315 B2 | 11/2017 | Le Guen et al. | |
| 10,122,723 B1* | 11/2018 | Chang | G06F 21/604 |
| 10,157,042 B1 | 12/2018 | Jayakumar et al. | |
| 10,181,985 B1* | 1/2019 | Passaglia | H04L 67/1061 |
| 10,209,859 B2* | 2/2019 | Yan | G06F 40/12 |
| 10,412,206 B1 | 9/2019 | Liang et al. | |
| 10,607,459 B1 | 3/2020 | Sanchez et al. | |
| 10,623,246 B1 | 4/2020 | Iyer et al. | |
| 10,880,284 B1 | 12/2020 | Hitchcock et al. | |
| 2003/0177012 A1 | 9/2003 | Drennan | |
| 2005/0149508 A1 | 7/2005 | Deshpande | |
| 2005/0153682 A1* | 7/2005 | Minear | H04L 12/2854 |
| | | | 455/405 |
| 2005/0195691 A1 | 9/2005 | Arnold et al. | |
| 2005/0257752 A1 | 11/2005 | Langer | |
| 2006/0069649 A1* | 3/2006 | Morten | G06F 21/50 |
| | | | 348/E7.056 |
| 2006/0092978 A1* | 5/2006 | John | H04M 3/527 |
| | | | 370/473 |
| 2006/0259767 A1* | 11/2006 | Mansz | G06F 21/51 |
| | | | 713/168 |
| 2007/0012793 A1 | 1/2007 | Flood et al. | |
| 2008/0136663 A1 | 6/2008 | Courtney | |
| 2008/0256613 A1 | 10/2008 | Grover | |
| 2009/0221264 A1 | 9/2009 | Minami | |
| 2010/0191352 A1 | 7/2010 | Quail | |
| 2010/0278345 A1 | 11/2010 | Alsina | |
| 2011/0167355 A1* | 7/2011 | Shelansky | G06F 21/41 |
| | | | 715/750 |
| 2011/0185437 A1* | 7/2011 | Tran | H04L 63/104 |
| | | | 726/28 |
| 2011/0296491 A1* | 12/2011 | Morohoshi | G06F 21/552 |
| | | | 726/3 |
| 2011/0302318 A1* | 12/2011 | Birger | H04N 21/4363 |
| | | | 709/231 |
| 2012/0016678 A1 | 1/2012 | Gruber | |
| 2012/0023157 A1 | 1/2012 | Roth | |

| | | | |
|---|---|---|---|
| 2012/0036119 A1 | 2/2012 | Zwicky | |
| 2012/0069131 A1* | 3/2012 | Abelow | G06Q 30/0601 |
| | | | 345/589 |
| 2012/0221502 A1* | 8/2012 | Jerram | G06Q 30/02 |
| | | | 706/46 |
| 2012/0245941 A1 | 9/2012 | Cheyer | |
| 2013/0086380 A1* | 4/2013 | Krishnaswamy | H04L 63/102 |
| | | | 713/168 |
| 2013/0268999 A1* | 10/2013 | Kiang | G06F 21/335 |
| | | | 726/4 |
| 2013/0332172 A1 | 12/2013 | Prakash | |
| 2013/0337803 A1* | 12/2013 | Christopher | H04W 48/18 |
| | | | 455/432.3 |
| 2014/0020073 A1* | 1/2014 | Ronda | H04L 63/0853 |
| | | | 726/7 |
| 2014/0047001 A1* | 2/2014 | Phillips | G06Q 10/10 |
| | | | 709/202 |
| 2014/0075385 A1* | 3/2014 | Wan | G06Q 30/0601 |
| | | | 715/812 |
| 2014/0094124 A1 | 4/2014 | Dave et al. | |
| 2014/0106677 A1 | 4/2014 | Altman | |
| 2014/0108263 A1* | 4/2014 | Ortiz | G06Q 20/36 |
| | | | 705/44 |
| 2014/0128063 A1* | 5/2014 | Chhabra | H04W 8/005 |
| | | | 455/435.1 |
| 2014/0136195 A1 | 5/2014 | Abdossalami et al. | |
| 2014/0164508 A1* | 6/2014 | Lynch | H04L 67/00 |
| | | | 709/204 |
| 2014/0267934 A1 | 9/2014 | Hardin | |
| 2014/0282007 A1 | 9/2014 | Fleizach | |
| 2014/0287687 A1* | 9/2014 | Bakin | H04W 4/70 |
| | | | 455/41.2 |
| 2014/0330560 A1 | 11/2014 | Venkatesha et al. | |
| 2014/0354405 A1* | 12/2014 | Kocher | G06F 21/32 |
| | | | 340/5.82 |
| 2015/0053781 A1 | 2/2015 | Nelson et al. | |
| 2015/0058447 A1 | 2/2015 | Albisu | |
| 2015/0161370 A1 | 6/2015 | North et al. | |
| 2015/0162006 A1 | 6/2015 | Kummer | |
| 2015/0163542 A1 | 6/2015 | Kashyap | |
| 2015/0169336 A1* | 6/2015 | Harper | G10L 15/22 |
| | | | 715/706 |
| 2015/0185996 A1* | 7/2015 | Brown | G06F 3/04842 |
| | | | 715/706 |
| 2015/0186538 A1* | 7/2015 | Yan | G06F 16/9535 |
| | | | 707/722 |
| 2015/0213355 A1 | 7/2015 | Sharma et al. | |
| 2015/0215350 A1* | 7/2015 | Slayton | G06F 9/453 |
| | | | 709/204 |
| 2015/0222517 A1* | 8/2015 | Mclaughlin | H04L 9/006 |
| | | | 713/156 |
| 2015/0250010 A1 | 9/2015 | Selen | |
| 2015/0256431 A1* | 9/2015 | Buchanan | H04L 67/22 |
| | | | 709/224 |
| 2015/0256517 A1* | 9/2015 | Yan | H04L 63/0428 |
| | | | 713/171 |
| 2015/0278531 A1* | 10/2015 | Smith | H04L 9/30 |
| | | | 713/165 |
| 2015/0296074 A1* | 10/2015 | Shah | H04W 12/08 |
| | | | 455/418 |
| 2015/0312394 A1 | 10/2015 | Mirza et al. | |
| 2015/0348533 A1 | 12/2015 | Saddler | |
| 2015/0350766 A1 | 12/2015 | Schobel | |
| 2015/0358814 A1* | 12/2015 | Roberts | H04L 63/0869 |
| | | | 713/169 |
| 2015/0365386 A1 | 12/2015 | Sallas | |
| 2015/0372999 A1 | 12/2015 | Pi-Sunyer | |
| 2016/0006812 A1 | 1/2016 | Xavier | |
| 2016/0027399 A1 | 1/2016 | Wilde | |
| 2016/0028828 A1 | 1/2016 | Tadajewski | |
| 2016/0036822 A1* | 2/2016 | Kim | H04L 67/306 |
| | | | 726/4 |
| 2016/0050553 A1* | 2/2016 | Kang | G06F 21/305 |
| | | | 455/41.2 |
| 2016/0057124 A1 | 2/2016 | Boyle et al. | |
| 2016/0066273 A1 | 3/2016 | Prats | |

(56) References Cited

U.S. PATENT DOCUMENTS

| | | | |
|---|---|---|---|
| 2016/0070581 A1* | 3/2016 | Soon-Shiong | G06Q 50/10 |
| | | | 715/706 |
| 2016/0071407 A1 | 3/2016 | Toebes | |
| 2016/0098992 A1 | 4/2016 | Renard | |
| 2016/0105424 A1 | 4/2016 | Logue | |
| 2016/0165387 A1 | 6/2016 | Nhu | |
| 2016/0173578 A1 | 6/2016 | Sharma | |
| 2016/0212488 A1 | 7/2016 | Os | |
| 2016/0226823 A1 | 8/2016 | Ansari et al. | |
| 2016/0241660 A1 | 8/2016 | Nhu | |
| 2016/0255095 A1* | 9/2016 | Maes | H04L 41/12 |
| | | | 726/1 |
| 2016/0259656 A1 | 9/2016 | Sumner | |
| 2016/0313974 A1 | 10/2016 | Chang et al. | |
| 2016/0344747 A1 | 11/2016 | Link, II | |
| 2016/0352518 A1* | 12/2016 | Ford | H04L 9/088 |
| 2016/0358598 A1* | 12/2016 | Williams | G10L 17/02 |
| 2017/0006471 A1 | 1/2017 | Kim | |
| 2017/0025124 A1* | 1/2017 | Mixter | G10L 15/32 |
| 2017/0026528 A1* | 1/2017 | Kim | G06F 16/5838 |
| 2017/0034666 A1* | 2/2017 | Priness | H04W 64/00 |
| 2017/0048376 A1 | 2/2017 | Logan | |
| 2017/0063967 A1* | 3/2017 | Kitchen | H04L 67/02 |
| 2017/0063968 A1* | 3/2017 | Kitchen | H04W 4/80 |
| 2017/0070491 A1 | 3/2017 | Logue | |
| 2017/0076263 A1 | 3/2017 | Bentz et al. | |
| 2017/0124842 A1 | 5/2017 | Sinha et al. | |
| 2017/0126674 A1* | 5/2017 | Lee | B33Y 10/00 |
| 2017/0126676 A1 | 5/2017 | Garding et al. | |
| 2017/0185376 A1 | 6/2017 | Chang et al. | |
| 2017/0188437 A1 | 6/2017 | Banta | |
| 2017/0200162 A1 | 7/2017 | Pourfallah et al. | |
| 2017/0201612 A1 | 7/2017 | Donley | |
| 2017/0208461 A1 | 7/2017 | Yin | |
| 2017/0223005 A1* | 8/2017 | Birgisson | H04L 63/083 |
| 2017/0264673 A1* | 9/2017 | Yalunin | H04L 65/1079 |
| 2017/0272784 A1 | 9/2017 | Shang et al. | |
| 2017/0368383 A1 | 12/2017 | Riccio | |
| 2018/0014189 A1 | 1/2018 | Ellison et al. | |
| 2018/0019964 A1 | 1/2018 | Larson | |
| 2018/0053401 A1 | 2/2018 | Martin et al. | |
| 2018/0075435 A1* | 3/2018 | Gandhi | H04W 12/068 |
| 2018/0081523 A1 | 3/2018 | Beaumont et al. | |
| 2018/0146367 A1* | 5/2018 | Altin | H04W 12/50 |
| 2018/0204204 A1 | 7/2018 | Giraudo | |
| 2018/0206122 A1* | 7/2018 | Bradley | H04W 12/0609 |
| 2018/0253666 A1 | 9/2018 | Fix | |
| 2018/0293484 A1* | 10/2018 | Wang | G06F 3/167 |
| 2018/0309866 A1 | 10/2018 | Devaraj et al. | |
| 2018/0316658 A1* | 11/2018 | Bartlett | H04W 12/041 |
| 2018/0324703 A1 | 11/2018 | Knudson | |
| 2018/0330274 A1* | 11/2018 | Brown | G06N 5/022 |
| 2018/0330737 A1 | 11/2018 | Paulik | |
| 2018/0336009 A1* | 11/2018 | Yoganandan | G10L 15/1815 |
| 2019/0034621 A1* | 1/2019 | Mondello | H04L 63/18 |
| 2019/0034808 A1 | 1/2019 | Palanichamy | |
| 2019/0088098 A1 | 3/2019 | Gangumalla | |
| 2019/0095973 A1 | 3/2019 | Byron | |
| 2019/0098037 A1* | 3/2019 | Shenoy, Jr. | H04L 63/105 |
| 2019/0108542 A1 | 4/2019 | Durvasula | |
| 2019/0122001 A1 | 4/2019 | Bradley et al. | |
| 2019/0124049 A1 | 4/2019 | Bradley et al. | |
| 2019/0286614 A1* | 9/2019 | Hornquist Astrand | |
| | | | H04L 9/0819 |
| 2019/0297034 A1 | 9/2019 | Gupta et al. | |
| 2019/0371315 A1* | 12/2019 | Newendorp | G10L 15/30 |
| 2020/0120094 A1 | 4/2020 | Jain et al. | |
| 2020/0127988 A1 | 4/2020 | Bradley et al. | |
| 2020/0175154 A1 | 6/2020 | Ratnakaram | |
| 2020/0227039 A1 | 7/2020 | Liu | |
| 2020/0265699 A1 | 8/2020 | Bango | |
| 2021/0154487 A1 | 5/2021 | Bongberg | |

FOREIGN PATENT DOCUMENTS

| | | | | |
|---|---|---|---|---|
| CN | 105959111 A | 9/2016 | | |
| CN | 106341459 | 1/2017 | | |
| CN | 106453032 | 2/2017 | | |
| CN | 106534102 | 3/2017 | | |
| CN | 106664296 | 5/2017 | | |
| CN | 107004195 A | 8/2017 | | |
| EP | 2432189 | 3/2012 | | |
| JP | 2014-228912 | 12/2014 | | |
| JP | 2015-531096 | 10/2015 | | |
| KR | 20150015481 | 2/2015 | | |
| WO | 2016200470 A1 | 12/2016 | | |
| WO | WO-2017131887 A1 * | 8/2017 | | H04W 12/0804 |
| WO | WO-2019016135 A1 * | 1/2019 | | G10L 15/22 |
| WO | 2019079015 | 4/2019 | | |
| WO | 2019079017 | 4/2019 | | |
| WO | 2020081374 | 4/2020 | | |

OTHER PUBLICATIONS

Pereira, Sancha, André Alves, Nuno Santos, and Ricardo Chaves. "Storekeeper: A Security-Enhanced Cloud Storage Aggregation Service." In 2016 IEEE 35th Symposium on Reliable Distributed Systems (SRDS), pp. 111-120. IEEE, 2016. (Year: 2016).*

Zidianakis, Emmanouil, George Papagiannakis, and Constantine Stephanidis. "A cross-platform, remotely-controlled mobile avatar simulation framework for AmI environments." In SIGGRAPH Asia 2014 Mobile Graphics and Interactive Applications, pp. 1-4. 2014. (Year: 2014).*

Yang, Ping-Jing, and Wai-Tat Fu. "Mindbot: a social-based medical virtual assistant." In 2016 IEEE International Conference on Healthcare Informatics (ICHI), pp. 319-319. IEEE, 2016. (Year: 2016).*

Sánchez, Rosa, Florina Almenares, Patricia Arias, Daniel Díaz-Sánchez, and Andrés Marín. "Enhancing privacy and dynamic federation in IdM for consumer cloud computing." IEEE Transactions on Consumer Electronics 58, No. 1 (2012): 95-103. (Year: 2012).*

Moudgil, Kartik, Ria Maheshwari, Harshal Bharatkumar Parekh, and Kailas Devadkar. "Cloud-based secure smartcard healthcare monitoring and tracking system." In 2017 second international conference on electrical, computer and communication technologies (ICECCT), pp. 1-8. IEEE, 2017. (Year: 2017).*

Helander, Johannes, and Yong Xiong. "Secure web services for low-cost devices." In Eighth IEEE International Symposium on Object-Oriented Real-Time Distributed Computing (ISORC'05), pp. 130-139. IEEE, 2005. (Year: 2005).*

Grzonkowski, Slawomir, and Peter M. Corcoran. "Sharing cloud services: user authentication for social enhancement of home networking." IEEE Transactions on Consumer Electronics 57, No. 3 (2011): 1424-1432. (Year: 2011).*

De Melo Silva, "A new architecture for secure storage and sharing of health records in the cloud using federated identity attributes." In 2014 IEEE 16th International Conference on e-Health Networking, Applications and Services (Healthcom), pp. 194-199. IEEE, 2014. (Year: 2014).*

Divakarla, Usha, and K. Chandrasekaran. "Trusted path between two entities in Cloud." In 2016 6th International Conference-Cloud System and Big Data Engineering (Confluence), pp. 157-162. IEEE, 2016. (Year: 2016).*

Thota, Saigopal, Raghu Anantharangachar, Sudhir Dixit, and Biswanath Mukherjee. "Trust-based collaboration service framework: A platform for communication and content sharing." IEEE Vehicular Technology Magazine 7, No. 3 (2012): 26-33. (Year: 2012).*

Anonymous: "Bluetooth-Wikipedia", Oct. 7, 2017 (Oct. 7, 2017), XP055552456, Retrieved from the Internet: URL: https://en.wikipedia.org/w/index.php?title=Bluetooth&oldid=804205348 [retrieved on Feb. 14, 2019].

PCT/US2018/053204, International Search Report and Written Opinion, mailed Feb. 13, 2019, 18 pgs.

N/a N/a: "User Manual Arlo Baby 1080p HD Monitoring Camera", May 1, 2017, pp. 1-79, XP055647421, Retrieved from the Internet:

(56)         References Cited

OTHER PUBLICATIONS

URL: https://data2.manualslib.com/pdf6/126/12554/1255302-netgear/arlo_baby.pdf?bbe0f0d7e66f4130fc13c084cb57b174, retrieved on Nov. 28, 2019.
PCT/US2019/055718, "Notification of Transmittal of the International Search Report and Written Opinion of the International Searching Authority, or the Declaration" mailed Dec. 5, 2019, 14 pgs.
PCT/US2018/053371, International Search Report and Written Opinion, mailed Nov. 19, 2018, 10 pgs.
Korean Office Action from Korean Patent Application No. 10-2020-7010959, dated May 14, 2021, 10 pages including English language translation.
European Office Action from European Patent Application No. 18789545.3, dated May 18, 2021, 5 pages.
Japanese Office Action from Japanese Patent Application No. 2020-521969, dated Jun. 3, 2021, 5 pages including English language translation.
Australian Office Action from Australian Patent Application No. 2018351962, dated May 10, 2021, 4 pages.
Korean Notice of Allowance from Korean Patent Application No. 10-2020-7011028, dated Jun. 24, 2021, 4 pages including machine-generated translation.
Australian Examination Report from Australian Patent Application No. 2018351962, dated Oct. 7, 2021, 6 pages.
Australian Notice of Acceptance from Australian Patent Application No. 2018351962, dated Oct. 21, 2021, 3 pages.
Korean Notice of Allowance dated Nov. 10, 2021, from Korean Patent Application No. 10-2020-7010959, 4 pages including English language translation.
Chinese Office Action from Chinese Patent Application No. 201811226436.7, dated Aug. 11, 2021, 24 pages including English language translation.

Japanese Decision to Grant a Patent from Japanese Patent Application No. 2020521969, dated Mar. 22, 2022, 5 pages including machine-generated English language translation.
European Office Action from European Patent Application No. 18789545.3, dated Apr. 4, 2022, 6 pages.
Qiu, "Techniques of P2P Apply to PKI Certificate Status Information Distribution," Master Dissertation of ChongQing University, May 2004.
Qureshi et al., "M-Trust: A Trust Management Scheme for Mobile P2P Networks," 2010 IEEE International Conference on Embedded and Ubiquitous Computing, 2010, pp. 476-483.
Zhen et al., "Main functions of online behaviors management system, its limitations and their solution," Chin J of Med Libr Inf Sci, Jul. 2013, vol. 22, No. 7, pp. 72-74.
CNOA from 201811226436.7, dated Jan. 6, 2022, 7 pages including machine-generated English language translation.
Australian Examination Report from Australian Patent Application No. 2022200714, dated Dec. 23, 2022, 4 pages.
Chung, et al., "Digital Forensic Approaches for Amazon Alexa Ecosystem," Jul. 27, 2017, DFRWS USA 201T Accepted paper, 11 pages.
Yue, et al., "Voice Activated Smart Home Design and Implementation," 2017, 2nd International Conference on Frontiers of Sensors Technologies (ICFST), IEEE, 4 pages.
European Office Action from European Patent Application No. 18789545.3, dated Apr. 3, 2023, 7 pages.
Australian Office Action from 2023285970, dated Sep. 25, 2024, 4 pages.
European Office Action from 18793518.4, dated Mar. 13, 2024, 5 pages.
Chinese Office Action from 202210274538.6, dated Dec. 13, 2024, 35 pages with machine translation.

* cited by examiner

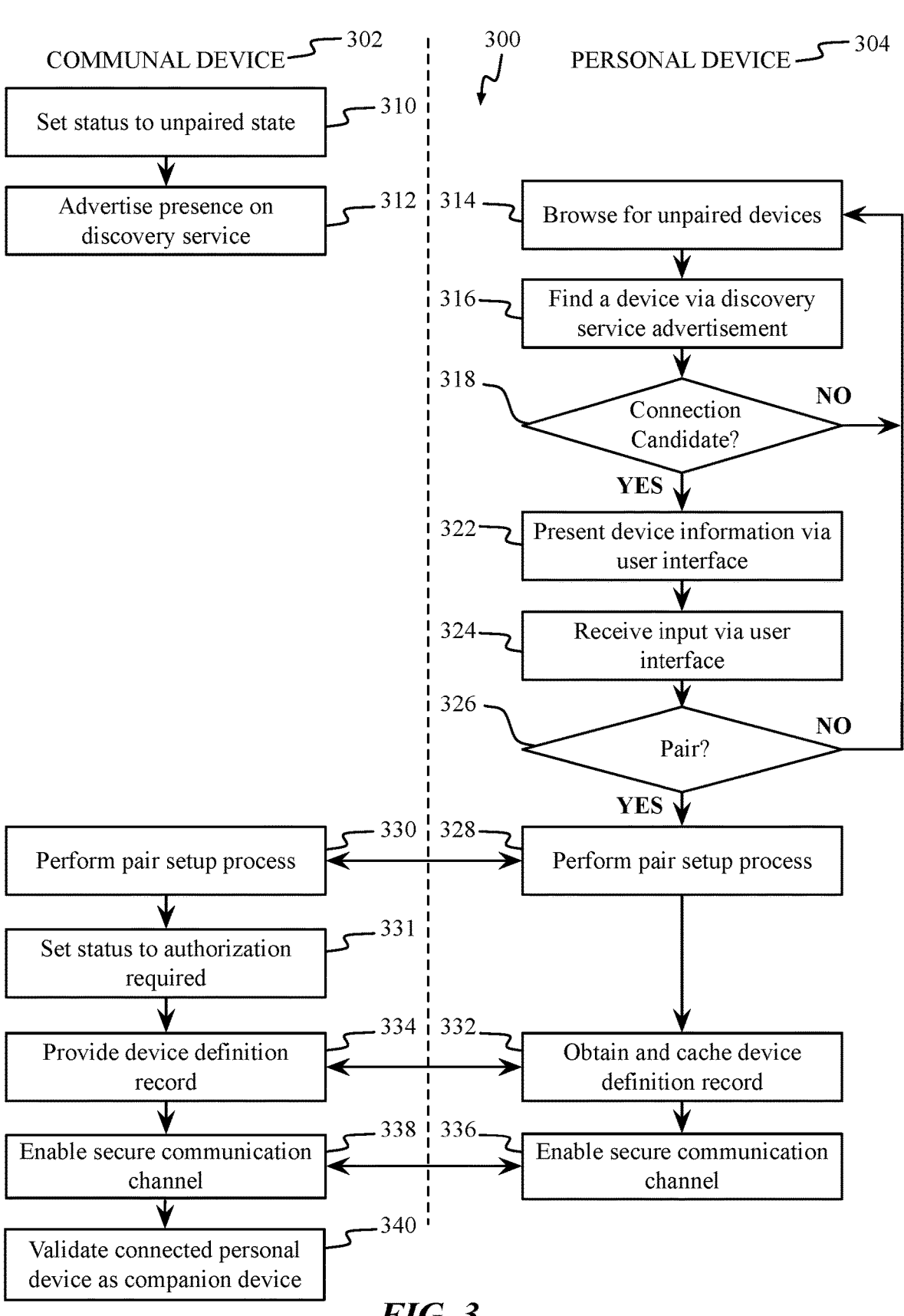

COMMUNAL DEVICE 302    300    PERSONAL DEVICE 304

Set status to unpaired state 310

Advertise presence on discovery service 312

314 Browse for unpaired devices

316 Find a device via discovery service advertisement

318 Connection Candidate?    NO

YES

322 Present device information via user interface

324 Receive input via user interface

326 Pair?    NO

YES

330 | 328 Perform pair setup process    Perform pair setup process

Set status to authorization required 331

334 | 332 Provide device definition record    Obtain and cache device definition record 338 | 336 Enable secure communication channel    Enable secure communication channel 340 Validate connected personal device as companion device

Receive request from communal device to process
a request requiring access to personal user data — 602

Personal data
access enabled? — 603

YES     NO

Prompt user for access to
personal data — 604

Personal data
access allowed? — 605

YES

NO

Access personal data and
process request from communal
device — 608

Reject request from
communal device — 606

700

800

1200

SECURE DEVICE TO DEVICE COMMUNICATION CHANNEL

This application claims priority to U.S. Provisional Patent Application No. 62/575,373 filed Oct. 21, 2017, which is hereby incorporated herein by reference.

BACKGROUND OF THE DISCLOSURE

Electronic devices known in the art can include an intelligent automated assistant system that can engage with a user of an electronic device. Generally, intelligent automated assistant systems provide a digital or virtual assistant that can perform actions on the electronic device or provide the user with requested information. These automated assistants can control many operations and functions of an electronic device, such as to dial a telephone number, send a text message, set reminders, add events to a calendar, and perform various other operations on behalf of a user. The automated assistant systems can receive spoken, natural language commands from a user and can speak responses to the user that are generated using a speech synthesis engine.

The services and operations for the automated assistants can be classified into various domains that describe an area of service for the automated assistant. Enabling complete functionality within certain domains may require access to personal or private data associated with, or specific to a user of the electronic device. Such data may be stored on the personal user device or stored in a remote location that is accessible to the user device. However, some implementations of an automated assistant can be included on communal devices that may be used by more than one user. For privacy purposes, it may be beneficial to avoid storing personal or private user information on communal devices. Accordingly, automated assistant services that require access to personal information for a user may not be available on communal devices.

SUMMARY OF THE DESCRIPTION

Embodiments described herein provide a communication mechanism that enables a communal electronic device, such as a smart speaker device or another smart home device, to relay or redirect virtual assistant requests involving personal user data to a personal user device for processing. The communication mechanism can also be used as a general-purpose communication mechanism that enables smart home device to exchange data, including configuration data.

One embodiment provides for a data processing system on an electronic device, the data processing system comprising a memory device to store instructions and one or more processors to execute the instructions stored on the memory device. The instructions, when executed, cause the one or more processors to enable an encrypted data channel between electronic devices. To enable the encrypted data channel, the one or more processors are configured to determine that a communication session is to be established between a first electronic device and a second electronic device, wherein the first electronic device and the second electronic device are each associated with a cloud services account. The one or more processors can be further configured to establish a peer-to-peer data connection between the first electronic device and the second electronic device, verify a trust relationship between the first electronic device and the second electronic device, and establish an encrypted communication session between the first electronic device and the second electronic device after verifying the trust relationship. The encrypted communication session can then be used to exchange data between the first electronic device and the second electronic device over the encrypted communication session.

One embodiment provides for a non-transitory machine-readable medium storing instructions to cause one or more processors to perform operations comprising determining that a communication session is to be established between a first electronic device and a second electronic device, where the first electronic device and the second electronic device are each associated with a cloud services account. The instructions can additionally cause the one or more processors to perform additional operations that include establishing a peer-to-peer data connection between the first electronic device and the second electronic device, verifying a trust relationship between the first electronic device and the second electronic device, establishing an encrypted communication session between the first electronic device and the second electronic device after verifying the trust relationship, and exchanging data between the first electronic device and the second electronic device over the encrypted communication session.

One embodiment provides for a method to be executed on a computing device or data processing system described herein. The method comprises determining that a communication session is to be established between a first electronic device and a second electronic device, where the first electronic device and the second electronic device are each associated with a cloud services account, establishing a peer-to-peer data connection between the first electronic device and the second electronic device via a wireless radio device, and verifying a trust relationship between the first electronic device and the second electronic device, where verifying the trust relationship between the first electronic device and the second electronic device includes verifying a previously established trust relationship. The method additionally includes establishing an encrypted communication session between the first electronic device and the second electronic device via a network layer protocol over a wireless network connection, the encrypted communication session established after verifying the trust relationship and exchanging data between the first electronic device and the second electronic device over the encrypted communication session. The data can be exchanged, for example, to synchronize device device data between the first electronic device and the second electronic device, where the device data is associated with the cloud services account.

Other features of the present embodiments will be apparent from the accompanying drawings and from the detailed description, which follows.

BRIEF DESCRIPTION OF THE DRAWINGS

Embodiments of the present invention are illustrated by way of example, and not limitation, in the figures of the accompanying drawings in which reference numbers are indicative of origin figure, like references may indicate similar elements, and in which:

FIG. 2 illustrates a home network environment including multiple smart home devices, according to embodiments;

FIG. 3 is a flow diagram of operations of a discovery process used to discover and pair a communal device with a companion device, according to embodiments;

DETAILED DESCRIPTION

Figure 1A:
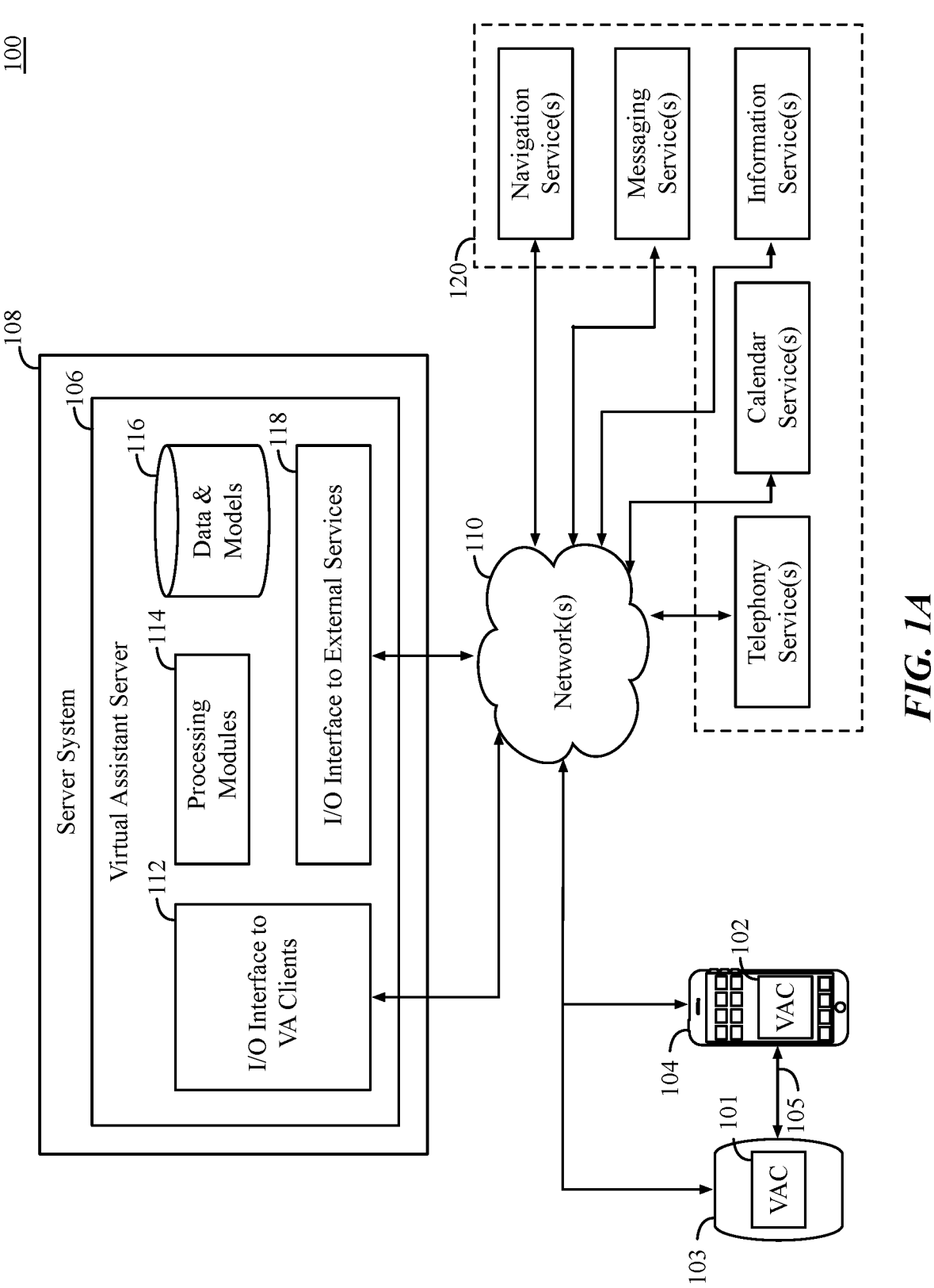
FIG. 1A-1B illustrates block diagrams of electronic device systems to enable virtual assistants and personal data domains, according to embodiments.

A network of connected smart home device can include a communal device that is used by multiple users within a household. As the device is a communal device having multiple users, it may be beneficial to avoid storing personal information that is specific to any given user of the device. Furthermore, it may be beneficial to prevent a user from performing unauthorized queries regarding the personal data of other users of the communal device. Exemplary personal or private user information associated with each user of the communal device can include, but is not limited to contact lists, calendar entries, text messages, e-mails, call history, alarms, reminders, and other electronic data that may be considered personal or private user data. In various embodiments, additional personal or private information can include, but is not limited to location information, family relationships, user preferences, application information, data stored on personal device, device location, family device locations, medical information, or health information. In some embodiments, some user data is considered inherently personal or private, while other information can be designated as personal or private information by a user.

Embodiments described herein provide systems and methods to enable a virtual assistant on a communal device to access personal domain functionality via a paired user device. The paired user device can be used as a companion device to the communal device. The pairing between the communal device and the companion device can enable the devices to establish trusted and secure communication over a secure data channel. In the event the virtual assistant on the communal device receives a query that requires access to personal user information that is not stored on or accessible to the communal device, the communal device can connect to the companion device and request the companion device to perform operations related to the personal user data.

Communication between the communal device and the companion device can be performed on a secure data channel referred to as a companion link. The companion link provides a persistent, low-latency messaging system for connected devices within a home network environment. In some embodiments, the companion link supports the linking of stationary communal devices within a home, such as speaker devices, with personal mobile devices in the home or reachable via the Internet. The companion link enables the communal devices to redirect of personal requests, which the communal device otherwise cannot handle due to privacy concerns, to one or more personal devices. The redirection of the personal requests to a personal device associated with a user can enable a virtual assistant on a communal device to receive and requests in a privacy-preserving manner.

In addition to enabling the redirection of personal queries to companion devices, in one embodiment the companion link also provides a general-purpose messaging system for devices within the home network environment. The general-purpose messaging system enables multiple home devices to work in concert by exchanging messages over the companion link. For example, audio playback between multiple smart speaker devices can be coordinated to enable the devices to perform operations such as, but not limited to coordinating playback of media items, selectively providing audio notifications to a user via the speaker closets to a user, configuring multiple speakers into a multi-channel audio system, or coordinating audio ducking at a speaker during the duration of a spoken request and response.

Communal devices can advertise support for the companion link service over a discovery protocol. Personal user devices on the same network as the communal device can discover the companion link service advertised by the communal device and connect with the communal device using advertised information. The personal device can perform a pairing process with the communal device to become a companion device for a user. In one embodiment, the pairing process includes a proximity element in which the user device exchanges identifiers, keys, or secrets with the companion device over a short-range wireless communication mechanism. The pairing process can also include the exchange of presence and reachability information that can facilitate subsequent connections between communal and companion devices over the companion link.

In the figures and description to follow, reference numbers are indicative of the figure in which the referenced element is introduced, such that an element having a reference number of N00 is first introduced in FIG. N. For example, an element having a reference number between 100 and 199 is first shown in FIG. 1, while an element having a reference number between 200 and 299 is first shown in FIG. 2, etc. Within a description of a given figure, previously introduced elements may or may not be referenced.

The processes and operations depicted in the figures that follow can be performed via processing logic that includes hardware (e.g. circuitry, dedicated logic, etc.), software (as instructions on a non-transitory machine-readable storage medium), or a combination of both hardware and software. Although some of the processes are described below in terms of sequential operations, it should be appreciated that some of the operations described may be performed in a different order. Moreover, some operations may be performed in parallel rather than sequentially. Additionally, some operations may be indicated as optional and are not performed by all embodiments.

System and Environment

Figure 1B:
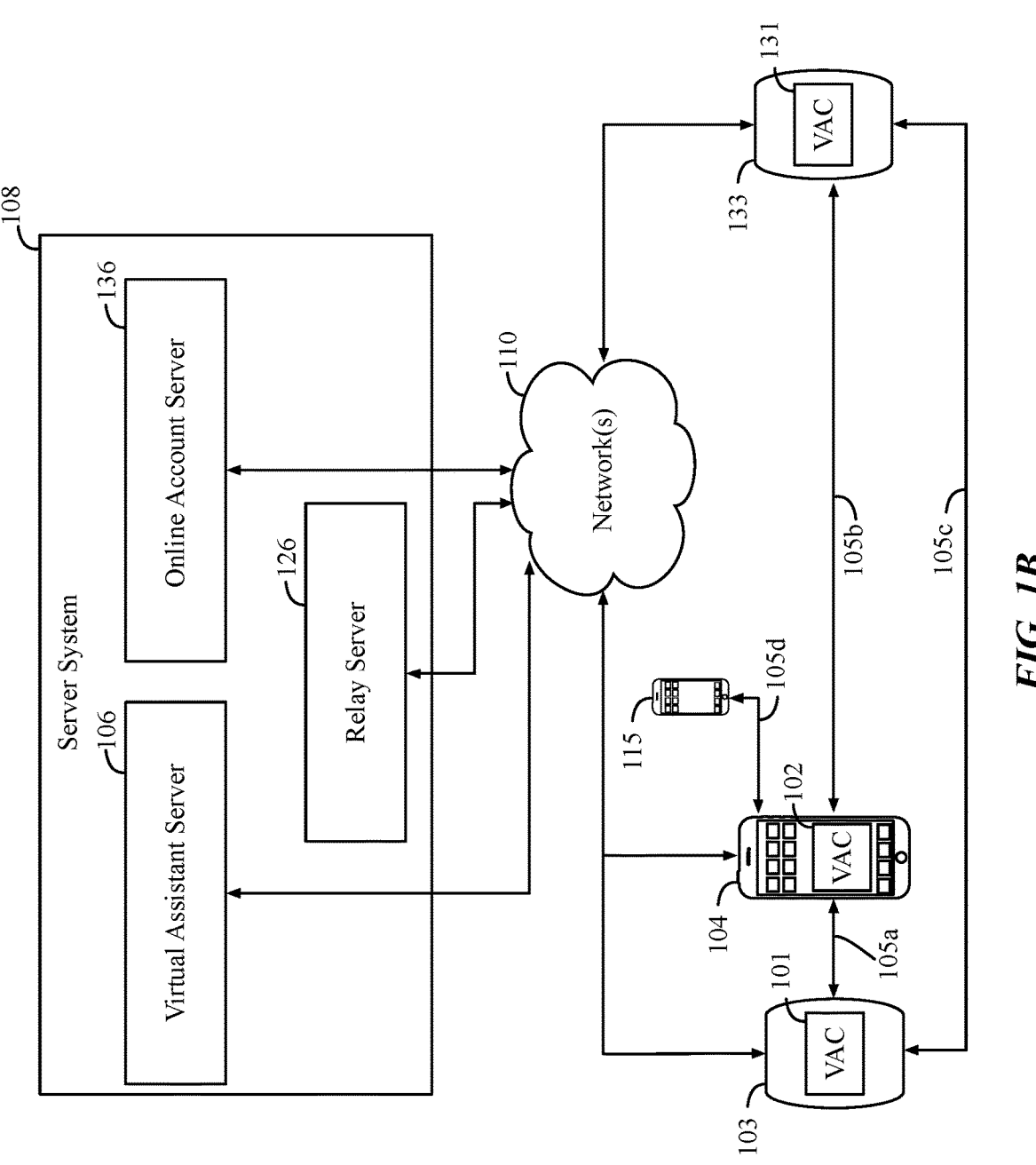

FIG. 1A-1B illustrates block diagrams of electronic device systems to enable virtual assistants and personal data domains, according to embodiments. FIG. 1A illustrates a block diagram of a virtual assistant system 100, according to embodiments described herein. FIG. 1B illustrates a block diagram of a companion link system 130 to enable communication between devices within a virtual assistant system 100, according to embodiments. The companion link system 130 of FIG. 1B can be used to establish a personal data domain within the virtual assistant system to enable a virtual assistant on a communal device to answer queries that require access to personal user data that is not stored on the communal device. The block diagrams of FIG. 1A-1B are in part logical, in that some components illustrated may separate logical components that reside within the same physical server or device.

FIG. 1A illustrates a virtual assistant system 100 that provides a processing system that interprets natural language input that is received in spoken and/or textual form to infer user intent. The virtual assistant system 100 can then perform actions based on the inferred user intent. In various embodiments, the system can perform a set of operations including, but not limited to identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form. As used herein, term virtual assistant can be used interchangeably with the terms "digital assistant," "intelligent automated assistant," or "automatic digital assistant," and generally refers to any information processing system that interprets natural language input in spoken and/or textual form to perform actions on behalf of a user.

A virtual assistant can accept a user request at least partially in the form of a natural language command, request, statement, narrative, and/or inquiry. Typically, the user request can seek either an informational answer or performance of a task by the virtual assistant. A satisfactory response to the user request can be a provision of the requested informational answer, a performance of the requested task, or a combination of the two. For example, a user can ask the virtual assistant a question, such as "Where am I right now?" Based on the user's current location, the virtual assistant can answer, "You are in Golden Gate Park near the west entrance." The user can also request the performance of a task, for example, "Please invite my friends to my girlfriend's birthday party next week." In response, the virtual assistant can acknowledge the request by saying "Yes, right away," and then send a suitable calendar invite on behalf of the user to each of the user's friends listed in the user's electronic address book. During performance of a requested task, the virtual assistant can sometimes interact with the user in a continuous dialogue involving multiple exchanges of information over an extended period of time. There are numerous other ways of interacting with a virtual assistant to request information or performance of various tasks. In addition to providing verbal responses and taking programmed actions, the virtual assistant can also provide responses in other visual or audio forms, e.g., as text, alerts, music, videos, animations, etc.

As shown in FIG. 1A, the virtual assistant system 100 can include a server system 108 having one or more server devices. In one embodiment, the server system 108 includes a virtual assistant server 106 that can communicate with multiple virtual assistant clients (VAC) (e.g., VAC 101. VAC 102). The virtual assistant clients can execute on multiple electronic devices that can connect and communicate with the server system 108. A first virtual assistant client (e.g., VAC 101) can execute on a smart home device 103, such as a smart speaker device. A second virtual assistant client (e.g., VAC 102) can execute on a user device 104, such as a smartphone device. The virtual assistant clients can communicate with the virtual assistant server 106 through one or more networks 110, which can include a combination of local and wide area networks. The various virtual assistant clients can provide client-side functionality, such as user-facing input and output processing, and can communicate with the virtual assistant server 106. The virtual assistant server 106 can provide server-side functionalities of a multitude of virtual assistant clients residing on any number of user devices connected via the one or more networks 110.

In one embodiment, the virtual assistant server 106 includes an I/O interface to VA clients 112, one or more processing modules 114, storage devices including data and processing models 116, and an I/O interface to external services 118. The I/O interface to VA clients 112 can facilitate the client-facing input and output processing for the virtual assistant server 106. The one or more processing modules 114 can utilize the data and processing models 116 to perform natural language processing on speech input to infer a user's intent. The one or more processing modules 114 can then perform task execution based on the inferred user intent. The I/O interface to external services 118 can facilitate communication between the virtual assistant server 106 and external services 120 through one or more networks 110. In one embodiment, the virtual assistant server 106 can communicate with the external services 120 to complete tasks in response to requests received at the VAC 102 on the user device 104, or to acquire information in response to a query received at the VAC 102. External services 120 can include, but are not limited to, navigation service(s), messaging service(s), information service(s), calendar service(s), and/or telephony services(s), and the like. For example, one or more navigation services can be used to enable turn-by-turn navigation on the user device 104 in response to a request received at the VAC 102 on the user device. External services can additionally include location information, weather, financial information, or account information. In various embodiments, logic to enable some of the external services 120 can reside within the server system 108, while some parts of the logic can reside within the user device 104.

The virtual assistant server 106 can communicate with one or more messaging services to send messages in response to speech input received from a virtual assistant client. Information service(s) such as Internet search engines or information databases can be accessed by the virtual assistant server 106 to provide information to a user in response to an information query. In one embodiment, the virtual assistant server 106 can access one or more calendar services to schedule a task or event, or to satisfy queries with respect to a task or event. The virtual assistant server 106 can also access one or more telephony services to initiate telephone calls for a user.

In various embodiments, the virtual assistant server 106 can assist the VAC 101, 102 by processing of speech input provided to the client by a user. In one embodiment, text to speech processing and natural language processing can be performed in part by the VAC 101, 102 and in part on the virtual assistant server 106. The data and processing models 116 of the virtual assistant server 106 may be more complex and higher performance than corresponding models that are locally accessible to VAC 101, 102. Accordingly, the virtual assistant server 106 may be more suitable for processing some commands and can send the results of the processed commands back to the VAC 101, 102 over the one or more networks 110. The operations to construct the virtual assistant interaction flow presented to a user can be shared between the virtual assistant server 106 and the VAC 101, 102. In one embodiment, initial processing of user input, presentation of speech output, and access to most user data can be performed by the VAC 101, 102. In such embodiment, speech recognition and natural language processing can be performed at least in part by the virtual assistant server 106.

The smart home device 103 and the user device 104 can communicate with each other and the server system 108 via one or more networks 110 local area networks (LAN) and/or wide area networks (WAN), e.g., the Internet. The one or more networks can be implemented using any known interconnect or network protocol, including various wired or wireless protocols. Exemplary interconnect and/or network protocols include Ethernet, Universal Serial Bus (USB), FIREWIRE, Global System for Mobile Communications (GSM), Enhanced Data GSM Environment (EDGE), code division multiple access (CDMA), time division multiple access (TDMA), Long Term Evolution (LTE), Bluetooth, Wi-Fi, voice over Internet Protocol (VoIP), Wi-MAX, or any other suitable communication protocol.

In various embodiments, the server system 108 can be implemented on a standalone data processing apparatus or a distributed network of computers. In some examples, server system 108 can also employ various virtual devices and/or services of third-party service providers (e.g., third-party cloud service providers) to provide the underlying computing resources and/or infrastructure resources of server system 108.

The smart home device 103, in various embodiments, can be a smart speaker device, smart home hub device, or another type of intelligent electronic appliance. For example, and in one embodiment the smart home device 103 is a smart speaker device that can be configured to be part of a distributed media playback system. A specific example of a smart speaker device is the HomePod® smart speaker device from Apple Inc. of Cupertino, California In one embodiment, the smart home device 103 can be a smart home hub device that is configured to manage one or more other devices in a digitally connected smart home system including, but not limited to intelligent and/or digitally connected devices such as a smart thermostat or smart lighting system. The smart home device 103 can connect with the user device 104 to exchange data. The connection between the smart home device 103 and the user device 104 can be performed over the one or more networks 110. In one embodiment, the smart home device 103 and the user device 104 can dynamically maintain a persistent connection as the user device 104 transitions between LAN and Internet connections.

The user device 104 can be any suitable electronic device. For example, and in one embodiment the user device 104 can be a portable multifunctional device, a multifunctional device, or a personal electronic device. A portable multifunctional device can be, for example, a mobile telephone that also contains other functions, such as a personal data assistant, a music player, and/or an application processor capable of executing applications (e.g., apps, etc.). Specific examples of portable multifunction devices can include the iPhone®, iPod Touch®, and iPad® devices from Apple Inc. of Cupertino, California Other examples of portable multifunction devices can include, without limitation, laptop or tablet computers, or a wearable electronic device such as a smart watch device. In some embodiments, the user device 104 can be a non-portable multifunctional device such as, but not limited to a desktop computer, game console, television, or television set-top box. In one embodiment, the user device 104 can be a fixture in a home, vehicle, motor home, etc. In some embodiments, the user device 104 can be or work in conjunction with a door or another point of entry for a vehicle, home, or mobile home.

The user device 104 can include a touch-sensitive surface (e.g., touch screen displays and/or touchpad interfaces), or one or more physical user-interface devices such as a physical keyboard, mouse, and/or joystick.

In one embodiment, the VAC 101 on the smart home device 103 can communicate with the VAC 102 on the user device 104 to facilitate the processing of speech input or to infer an intent of a command received at the smart home device 103. For example, in one embodiment the smart home device 103 can be a communal device that is used by multiple users within a household. Certain personal or private information for users of the communal device, such as contact information, calendar information, message data, etc., can be classified as private for a given user. To avoid storing such private information on a smart home device 103 that is a communal device or enabling a communal device to access servers containing or having access to such information (e.g., the virtual assistant server 106), the VAC 101 on the smart home device 103 can be associated with a user device 104 that can facilitate access to such information. When the VAC 101 on the smart home device 103 is to perform a command or action that requires access to private information associated with a user, the VAC 101 on the smart home device 103 can communicate with the user device 104 and/or the VAC 102 on the user device 104 to acquire information used to perform the requested command or action.

A single user can be associated with multiple user devices 104. In such circumstance, a single instance of the user device 104 may be designated as a companion device. The smart home device 103 will then communicate with the companion device to enable the processing of certain requests. For example, a user can have multiple instances of the user device 104, such as one or more smartphone devices, one or more tablet devices, or a laptop device. The user can designate one of such user devices 104 as a companion device to which the smart home device 103 will communicate to acquire access to private user information.

In some embodiments, the smart home device 103 and the user device 104 can establish and maintain a companion link 105, which is a persistent or semi-persistent connection that enables the VAC 101 on the smart home device 103 to query the user device 104 and/or the VAC 102 on the user device 104 for private information. In one embodiment, the companion link 105 is an always-connected, low-latency messaging system that enables communication between devices within a home. Such connection can be maintained locally over a LAN or can be established over a wide area network, such as the Internet. The companion link 105 can enable communal devices to redirect personal requests to a user device, such that the requests can be processed in a privacy-preserving manner.

FIG. 1B illustrates a companion link system 130 that enables communication between devices within the virtual assistant system 100 of FIG. 1A. In various embodiments, the companion link system 130 can enable secure and authenticated message exchange between multiple devices. The multiple devices can include one or more user devices (e.g., user device 104, user device 115), which each may be a portable multifunctional device. The multiple devices can also include one or more stationary devices, such as one or more communal smart home devices (e.g., smart home device 103, smart home device 133) that may be used by multiple users. In one embodiment a set of companion links 105a-105b can enable message-based communication between a user device and one or more communal smart home devices. A companion link 105c can also be established between communal smart home devices to enable communication between those devices. In one embodiment, a companion link 105d can also be established between user devices to enable peer-to-peer exchange of device data.

In one embodiment, the set of companion links 105a-105b can be used to enable communal stationary devices to redirect personal requests to a personal device associated with a user, to enable such request to be processed in a privacy-preserving manner. For example, and in one embodiment, a user may speak a personal query, to a communal device, such as "When is my next meeting?" The personal query can be received by the VAC 101 or VAC 131 on smart home device 103 or smart home device 133. As such request makes use of the speaking person's calendar, the communal device may not have direct access to such personal data. To satisfy such a request, the communal device can redirect the query to a designated companion device, such as user device 104, to perform analysis of the query and generate an audio response that can be sent back to the communal device for playback to the user.

In various embodiments, the redirection can be performed in an explicit or implicit manner. For an explicit redirection, the VAC 101 on smart home device 103 or the VAC 131 on smart home device 133 can receive a request and submit the request, at least in part, to the virtual assistant server 106 for processing. The virtual assistant server 106 can determine that to satisfy the request, at least some information may be required from the companion device (e.g., user device 104). In one embodiment, an explicit redirection can be performed in response to such determination in which the virtual assistant server 106 can send a request to the user device 104, over the one or more networks 110, to retrieve personal information that will be used to process the request. In one embodiment, a communal smart home device can use an implicit redirection in which the virtual assistant client on the smart home device 103 can redirect the virtual assistant request to the VAC 102 on the user device 104. The VAC 102 on the user device 104 can then process the request as though the request were received directly at the user device 104. The user device 104 can then formulate an audio response for playback on the communal device.

In addition to enabling the processing of queries in a privacy preserving manner, in one embodiment a companion link 105c can enable general purpose messaging that enables communication between communal devices, such as smart home device 103 and smart home device 133. Such link enables the communal devices to work in concert to coordinate operation. For example, smart home device 103 and smart home device 133 may be configured as part of a distributed media playback system that can play music or other media. The companion link 105c established between smart home device 103 and smart home device 133 can be used to coordinate media playback or to coordinate multi-channel audio playback over the multiple devices. When a user speaks a query to one of the smart home devices, the devices can exchange messages to coordinate ducking of audio playback for the duration of the spoken request and any associated audio responses. Using the companion link system 130, any number of communal smart home devices and user devices can communicate to exchange audio data, media playlists, configuration data, and other information used to enable a connected digital home system.

In one embodiment, companion links 105a-105d can be established over a local network connection (e.g., LAN) via a local wired and/or wireless network connection. In one embodiment, the companion links 105a-105d can also be established over a WAN connection, such as an Internet connection, although policy and configuration determinations may optionally be configured to limit the companion link 105c between smart home devices 103, 133 to a single network. In one embodiment, in addition to the virtual assistant server 106, the server system 108 can include an online account server 136 to which user devices 104, 115 and smart home devices 103, 133 can connect via the one or more networks 110. The online account server 136 can include information associated with an online account of a user associated with the various devices. In some embodiments, the online account server 136 can also include or be associated with server hardware and software logic to provide online services including online storage, messaging, e-mail, media and streaming services, or navigation services. In one embodiment, the online account server 136 can also provide or facilitate access to one or more of the external services 120 of FIG. 1B. In one embodiment, the online account server 136 can also provide or facilitate access to an online store, such as an online application store (e.g., app store) and/or an online media store, such as a music, video, or e-book store.

In one embodiment, a companion link 105d between user devices 104, 115 can be used to enable peer-to-peer data exchange. In one embodiment, automatic data exchanges between the devices can be configured to be performed over the companion link 105d. For example, where user device 104 and user device 115 are each associated with the same account on the online account server 136, a credential exchange can be performed via the online account server to enable the automatic establishment of an encrypted communication channel between the devices whenever the devices are within direct communication range. In one embodiment, data for cloud services associated with the online account server 136 can be exchanged between devices over the companion link 105d instead of over the one or more networks 110. In one embodiment, the online account server 136 can maintain a list of devices associated with a single account or a list of devices associated with a family of associated accounts. The list of devices associated with an account of family of accounts can be used to facilitate device discovery and the establishment of companion link connections between devices. The accounts on the online account server can enable mutual authentication between the electronic devices via an exchange of authentication credentials.

In one embodiment, the online account server 136 includes or is associated with a registration server to register a unique device identifier associated with each device with an online account associated with a user. Once a device has been registered with an online account of a user, an identifier token can be created that enables the device to be located and identified over the networks 110. The identifier token can include one or more cryptographic keys, tokens, certificates, or other data that allows the virtual assistant server 106, online account server 136, and other servers within the server system 108 to locate and identify a device across the one or more networks 110. In some embodiments a smart home device 103, 133 can use the identifier token to establish a remote connection with the user device 104 if the user device is outside of the home or is not connected to the home network of the smart home devices. The smart home devices 103, 133 can use the identifier token to locate the user device 104 on a mobile wireless network and establish a secure remote companion link connection with the user device 104. Locating the user device 104 and establishing the connection to the user device can be facilitated in part via the virtual assistant server 106 and the online account server 136. In such embodiments, at least a subset of the companion device functions of the user device 104 can continue to operate when the user device 104 is away from home, or if the user is at home but is not connected to the home network.

In some embodiments each virtual assistant client (VAC 101, VAC 102, VAC 131) executing on a device can be associated with a virtual assistant identifier. In various embodiments, the virtual assistant identifier can be associated with or derived from the identifier token for the host device, an account identifier associated with an online account of a user of the device, and/or another token associated with or derived from the account or device identifiers. The virtual assistant identifier of a virtual assistant client can uniquely or quasi-uniquely identify the VAC 101, 102, 131 on the various devices when the virtual assistant clients are communicating with each other or the virtual assistant server 106. The virtual assistant identifier can be associated with identification or location information of the host device of the virtual assistant, such as the identification token of the host device. After a paring relationship is created between a smart home device 103, 133 and the user device 104, the virtual assistant clients (VAC 101, VAC 131) on the smart home device can store the virtual assistant identifier and use the virtual assistant identifier to locate, identify, and communicate with the VAC 102 on the user device 104. The virtual assistant identifier for the VAC 102 can also be sent to the virtual assistant server 106 and stored as a companion virtual assistant identifier. Should the virtual assistant server 106 require access to private information of a user to perform processing operations for a request received at the VAC 101, 131 of the smart home device 103, 133, the virtual assistant server 106 can contact the VAC 102 of the user device 104 on behalf of the VAC 101, 131. The virtual assistant server 106 can then receive from the VAC 102 on the user device 104, in various embodiments, private information from the user device 104, processing results of an information processing task dispatched to the user device 104, or permission and/or access credentials to access private data on behalf of the user device 104.

In some embodiments, the server system 108 includes a relay server 126 that can be used to facilitate remote connections between a smart home device 103, 133 and the user device 104. The relay server 126 can enable a relay service that can relay companion link messages between devices in the event a local connection or another form of remote connection, such as a remote peer-to-peer connection, cannot be established. The relay server 126 can enable remote companion link message passing based on a relay pairing established between the smart home devices 103, 133 and the user device 104. Keys, certificate, and other identification and verification data associated with the various devices can be exchanged during the local pairing process that can be used to establish a relay pairing between devices. Once a relay pairing has been established between devices, the smart home devices 103, 133 can send messages to the relay server 126 with a unique relay identifier associated with the user device 104.

Each device that can connect with the relay server 126 can have an associated relay identifier, which is a persistent pairing token the can be used to identify and authenticate the connecting devices. The relay identifier can be, include, or be derived from a device identifier or identifier token that uniquely identifies the device and can include certificates and/or signatures that enable verification of the relay token.

The relay server 126 can then relay the messages to the user device 104. In one embodiment, a persistent and bidirectional connection can be established, enabling the user device 104 to send return messages to the smart home device 103, 133 via the relay server 126. In one embodiment, the user device 104 can also initiate a connection with a smart home device 103, 133 using a relay identifier associated with the device. In one embodiment, relay identifiers are used for each message exchanged over the relay server 126, enabling the relay server 126 to verify the authenticity of each message relayed though the server and to prevent unauthorized devices from transmitting messages via an established relay server connection.

Figure 2:
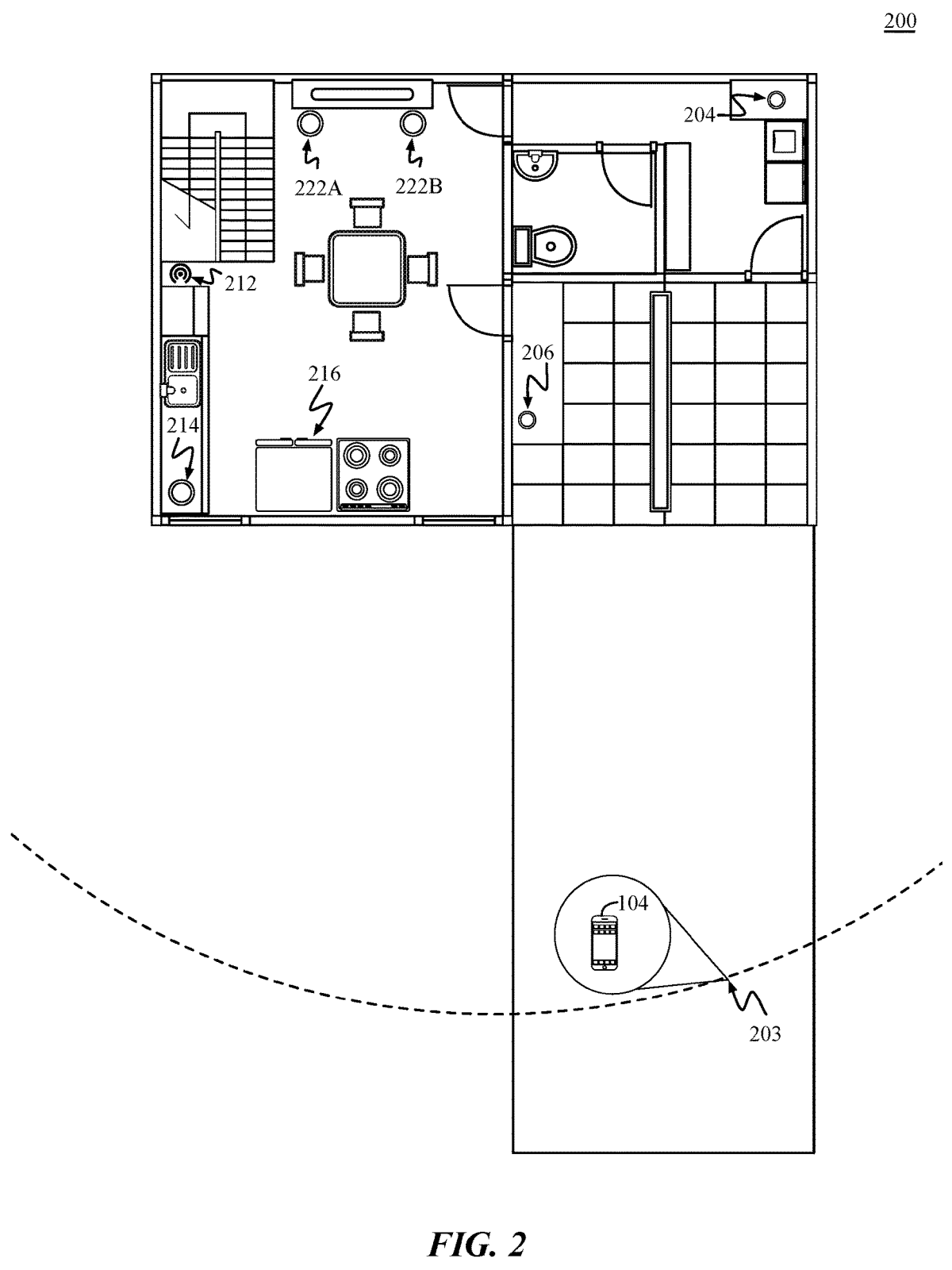

FIG. 2 illustrates a home network environment 200 including multiple smart home devices, according to embodiments. The home network environment 200 can include a wireless access point 212 to provide access to a wireless network that services the home network environment. Multiple smart home devices 204, 206, 214, 216, 222A-222B, can be connected to the home network environment 200 via the wireless network, or optionally a wired network connection. In various embodiments, the home network environment can include various types of smart home devices. For example, smart home device 204, 206, 214, can be smart speaker devices that are configured to distributed media playback. Additionally, smart home device 216 can be a smart appliance device, such as a smart refrigerator device. Each of the smart home devices 204, 206, 214, 216, 222A-222B can use the network of the home network environment 200 to establish interconnecting companion links to enable the devices to exchange configuration information. For example, smart home devices 222A-222B can be configured as multi-channel smart speaker devices, which can use the companion link to configure multi-channel (e.g., stereo, surround, etc.) audio playback. Additionally, each of the smart home devices 204, 206, 214, 216, 222A-222B can include virtual assistant clients which, in the event of a request that requires access to private user information, can interact with a designated companion device over a companion link to facilitate processing of the request. User devices such as a mobile instance of the user device 104 or a connected vehicle infotainment system, can also be configured to connect to the home network environment when in proximity to the wireless access point 212. In one embodiment the user device 104 can also create a companion link connection to any other user devices that may be connected to the home network environment 200, or within direct radio range of the user device 104.

Device and Companion Discovery

Before a companion link communication channel is established between a user device 104 and a smart home device 204, 206, 214, 216, 222A-222B, a companion discovery and pairing process is performed. The companion discovery process enables a smart home device to locate a companion device through which the virtual assistant client (e.g., VAC 101, 131 as in FIG. 1A-1B) on the smart home device is to access private user information that may be used to process and/or respond to a user request. The companion discovery process, in some instances, can also include user verification that communication between the smart home device and the companion device should occur. In some embodiments, companion discovery can leverage existing service discovery protocols that facilitate locating devices and/or services on a wireless or other network, such as the Simple Service Discovery Protocol (SSDP) developed by the UPnP Forum or the Bonjour networking technology developed by Apple Inc. (published as IETF RFC 6762 and IETF RFC 6763 and referred to herein as "Bonjour"). In a device discovery service, a device can advertise information indicating its existence, address, and optionally additional information about its capabilities. Other devices, including other smart home devices or user devices, can browse the advertisements and identify devices of interest based on the broadcast information. Using the advertised address, a browsing device can initiate communication with the advertiser.

Depending on the network and discovery service, advertising can optionally include real-time broadcasting of information (e.g., through a multicast or beacon signal) and/or providing advertisement information to a central repository (e.g., at a network access point) from which other devices can retrieve the information. Browsing of advertisements can include detecting broadcast advertisements and/or retrieving advertisement information from the central repository. In some embodiments, communal smart home devices that are stationary attached to a power source, such as an electrical outlet, can continuously perform advertisement and discovery for the companion link service. Mobile user devices can enable discovery of the companion link service based on the location of the user device. For example, and in one embodiment, a geo-fence boundary 203 is configured on the mobile device, such that companion link discovery is enabled when the mobile device is within a geographic proximity to a location designated as the home location of the user device 104.

When a communal smart home device is discovered by a user device acting as a companion device (e.g., user device 104), a network data connection (e.g., TCP, UDP, etc.) can be established between the communal smart home device and the companion device. The network data connection can be established using any network layer (e.g., layer 3) protocol. To avoid connection races between devices that are both advertising and discovering, the device with the lexicographically lower persistent identifier initiates the connection between devices. The persistent identifier of a device is derived from an anonymized identifier that is advertised via the discovery service. In one embodiment, to derive the persistent identifier based on advertised information make use of data exchanged via a previously performed pairing process. In such embodiment, a data connection cannot be established with a smart home device until the smart home device is paired with a user device, as the persistent identifier used to connect with a communal smart home device is otherwise unknown. Once a data connection is established, a secure communication session can be established between the communal smart home device and the companion device. The communal smart home device and the connected companion device can then exchange presence and reachability information. Where the companion device is a mobile device, the companion device can then enter a wake-on-wireless (WoW) state as needed, when data is not being exchanged over the companion link, while communal devices that are connected to a power source can remain active to reduce first-message latency.

In the event connectivity is lost between devices, the discovery service can be re-enabled and used to search for the device on the local network. If the missing device is re-discovered, the data connection between devices can be re-established. If the missing device cannot be discovered, state discovery service information in the records of the missing device is reconfirmed and cleaned. The searching device can then attempt to establish communication with the missing device via a secure internet session. In one embodiment, part of the presence and reachability information exchanged when establishing a data connection includes a device identifier, identifier token, relay identifier, or another form of identification token that can be used to reach or enable message exchange with the missing device, for example via a peer-to-peer or relayed Internet connection. If a secure Internet connection can be successfully established with the previously missing device, companion link messages can be exchanged over the secure Internet connection.

In the event a companion device is connected to a smart home device via an Internet-based connection and a local connection becomes available, the companion link connection can be switched to the local connection. For example, user device 104 can cross a geo-fence boundary 203 an enable a discovery protocol (e.g., SSDP, Bonjour, etc.) to search for devices (e.g., smart home devices 204, 206, 214, 216, 222A-222B). Should the user device 104 discover the availability of a local connection to the smart home device to which the user device 104 is connected to over the Internet connection, the user device can transition the Internet connection to a local (e.g., Wi-Fi) connection. In one embodiment, connection switching can be performed whenever connectivity is lost between connected devices (e.g., the user device 104 leaves the home network environment 200) or if the devices determine that a better connection is available (e.g., the user device 104 returns to the home network environment 200). Local connections can be preferred to Internet connections, as local connections presumably are lower latency. Additionally, it may be less resource intensive from a device and infrastructure standpoint to maintain a local connection instead of an Internet connection.

FIG. 3 is a flow diagram of operations of a discovery process 300 used to discover and pair a communal device with a companion device, according to embodiments described herein. The illustrated discovery process 300 includes operations performed on a communal device 302 and a personal device 304. The communal device 302 can be any smart home device described herein (e.g., smart home device 103, 133, as in FIG. 1, smart home device 204, 206, 214, 216, 222A-222B as in FIG. 2). The personal device 304 can be any personal user device described herein (e.g., user device 104), such as, but not limited to, a smartphone device, tablet computer device, or another user device storing personal data that may be accessible by the communal device 302 via a companion link. While the discovery process 300 is illustrated and described as being performed between a communal device 302 and a personal device 304, a variant of the illustrated process can also be performed between multiple instances of a communal device 302 or between multiple instances of a personal device 304.

In one embodiment, as shown at block 310, the communal device 302 can set a status bit to indicate that the device is currently unpaired or is otherwise looking for a companion device with which to pair. The status bit can be a bit in a status flag indicator that listed in the status information advertised by the communal device 302. At block 312, the communal device 302 can advertise its presence via a discovery protocol (e.g., SSDP, Bonjour, etc.) as having support for the companion link service. For instance, using Bonjour, the communal device 302 can advertise itself with a name and a service type. The name can be a user-readable name for the companion discovery (e.g., "Speaker"); in some instances, the advertised name can be the name specified in the companion discovery information service instance of a device definition record. The service type can be defined for the uniform accessory protocol (e.g., service type "_companion-link._tcp"). The advertisement can also include additional information. Similar information can be distributed using other service discovery protocols and techniques. For instance, using SSDP, companion discovery can include advertising a name and service type URI using a multicast HTTP NOTIFY message. The URI can be used by the personal device 304 to retrieve additional information via a unicast request to the communal device 302.

After the communal device 302 begins advertising the companion link service via a service discovery protocol, the personal device 304 can discover the communal device when browsing for unpaired devices, as shown at block 314. No particular timing is required between the beginning of advertisement and the beginning of service browsing, although the personal device 304 will be unable to discover the communal device 302 unless the communal device 302 discovery advertisement is detectable when the personal device 304 browses.

In one embodiment, the personal device 304 can browse for unpaired devices in response to a trigger, such as a trigger provided by an application execution on the personal device 304. In one embodiment, the personal device 304 can browse for unpaired devices when the personal device 304 is placed in physical proximity to an unpaired device. For example, an out-of-box proximity setup for the communal device can include a data exchange over a short-range wireless communication mechanism (e.g., using Bluetooth and/or Bluetooth Low Energy, NFC, etc.), which can trigger the personal device 304 to browse for unpaired devices.

At block 316, personal device 304 can find a device via the discovery service advertisement, for example, by detecting the advertisement performed at block 312. At block 318, the personal device 304 can determine, based on the advertisement, whether the discovered device is a connection candidate, such as the unpaired communal device 302. In one embodiment, the personal device 304 can determine the discovered device is a connection candidate when the discovered device is advertising the companion link service. The personal device 304 can check the discovery status flags to determine whether the communal device 302 is already configured or paired with a companion device. As another example, the personal device 304 can check the advertised protocol version to determine whether the companion link protocol version of the communal device 302 is compatible with the companion link protocol supported by the personal device 304. If the personal device 304 determines that the accessory is not advertising for a companion device with which to establish a companion link, the personal device 304 can return to block 314 and continue to browse. In one embodiment, after a period of time in which a communal device is not discovered, the browsing operations may timeout and browsing for unpaid devices may discontinue for a time.

At block 322, the personal device 304 can present information about the communal device 302 to the user via a user interface, such as a display device of the personal device 304. At block 324, personal device 304 can receive input from the user via the user interface regarding actions to perform with the detected device. For example, the user can provide input indicating whether the personal device 304 should establish a pairing with the communal device. The personal device 304 can present any or all of the information obtained from the advertisement data provided by the communal device and prompt the user to indicate whether the personal device 304 should connect to the communal device 302. Requesting user confirmation can help to avoid spurious or unwanted pairings between a communal device and a personal device. At block 326, the personal device 304 can interpret the user input received at block 324 and determine whether to pair with the communal device 302. In addition to user approval to initiate a pairing operation, other operations can be performed to complete the pairing operation to minimize risk of a pairing occurring without approval of the rightful owner/operator of the personal device 304, as completing the pairing procedure can allow the communal device 302 to accept queries of a personal nature regarding the user of the personal device 304. For example, the personal device 304 and/or communal device 302 may request the input of a passcode known to the user of the personal device 304. In one embodiment, biometric verification (e.g., fingerprint, facial recognition, etc.) can be requested by the communal device 302 and/or the personal device 304 to complete the paring operation at block 326.

If the user directs the personal device 304 to decline the pairing or a user verification operation fails, the personal device 304 can return to block 314 to look for other accessories or devices. If the personal device 304 and the communal device 302 are to pair, at block 328 and block 330, the personal device 304 and communal device 302 can respectively execute a pair setup process. In some embodiments, the pair setup process can be used to establish encryption keys to facilitate secure communication between the personal device 304 and the communal device 302. In some embodiments, user confirmation can be incorporated into the pair setup process, and a separate user confirmation prior to initiating pair setup is not required. In one embodiment, the pair setup process enables the establishment of a trusted relationship between the communal device 302 and the personal device 304. The established trust relationship can be later verified during setup of a secure communication session.

If the pair setup process completes successfully, at block 331 the communal device 302 can update device status information to indicate that authorization is now required to communicate with the accessory and/or that the accessory is now paired with at least one personal device, for example, by updating a status flag indicator within the advertised device data.

At block 332, the personal device 304 can obtain and cache a device definition record from the communal device 302, which can provide the record upon request at block 334. The device definition record can include a set of services supported by the device and/or other relevant characteristics that can enable other the personal device 304, as well as other connected devices, to determine how to control, connect with, or otherwise interact with the communal device 302. Where the personal device 304 caches the device definition record, the information can be used to facilitate detecting state changes in communal device 302. In some embodiments, the personal device 304 can also cache information from the advertisement data provided by the communal device 302, which can also be used to detect state changes in the communal device.

At blocks 336 and 338 the personal device 304 and the communal device 302 can begin to exchange data used to establish a secure communication channel. The data exchange can include a key or certificate exchange between the devices. The key exchange can be protected via a shared secret exchanged between devices, where the shared secret can be exchanged using an out-of-band communication method. Additionally, the data exchange can include the exchange of one or more long term keys between the devices, which may themselves be protected by one or more short-term keys. Once a pairing is established, the pairing can be leveraged to provide end-to-end message encryption such that only paired devices can read messages exchanged between the devices. In one embodiment, the secure communication channel is a bidirectional channel, enabling either device communicating not the channel to initiate a message exchange. During a message exchange, whichever device initiates the communication session is referred to as the client device, while the device accepting the session is referred to as the server device. In one embodiment, the first message exchanged between devices is an information exchange message. The client device can send an initial information message including feature flags or other device information. The server device can then respond with an information message as to supported features. Once the secure communication channel is established and the information exchange occurs, the communicating devices can enter an idle state if there are no immediate operations pending.

In one embodiment, the communal device 302 can perform an additional operation at block 340 to validate the connected personal device 304 as a companion device. In such embodiment, the discovery process 300 may be performed with multiple devices that are a legitimate personal devices of a user but may not be personal device that has been designated as a companion device for use with the communal device 302. In one embodiment, only one of a set of multiple possible personal devices will be designated as a companion device to the communal device 302. The personal device 304 is of the user that is designated as a companion device can be determined via a variety of mechanisms. In some embodiments, a user can enable a setting on the personal device 304 that indicates that the personal device can be configured as a companion device. In one embodiment, the setting can be a specific companion device setting that indicates that the user has designated this particular personal device for use as a companion device for connected smart home devices. In one embodiment, the companion device selection can be determined indirectly based on other settings on the personal device 304. For example, the communal device 302 can determine that the personal device 304 is designated as a companion device if the personal device is configured to be the source of location information for the user.

It will be appreciated that the discovery and pairing process described herein is illustrative and that variations and modifications are possible. Operations described as sequential may be executed in parallel, order of steps may be varied, and steps may be modified, combined, added or omitted. Furthermore, while the SSDP and Bonjour services are used as examples of a device discovery service, similar concepts can be applied in the context of other device discovery services. In some embodiments, prior to determining whether to pair with the communal device 302 or any other discovered device, the personal device 304 can request a definition record (or a portion thereof) from the paring candidate device, which can be requested, for example, via an HTTP request). Depending on configuration, the paring candidate device can provide all, some, or none of its accessory definition record in response to a request from an unpaired personal device. Alternatively, definition records may be accessible before a pairing is established and the decision whether to pair can be based on the advertisement information provided by the paring candidate device. The advertisement data can include, for example, a local name for the device; a unique accessory identifier; flags indicating that the accessory is discoverable; a universally unique identifier (UUID) for at least some of the services; an indicator of the device state; and an indication of whether the device has performed pair setup with any other personal devices.

In some embodiments, the discovery process 300, or a similar process, can be used to detect state changes in paired devices. For example, a state number value that is advertised by a device can be incremented when device state changes. When a device (e.g., communal device 302) advertises a state change, other paired devices (e.g., personal device 304) can advertise the state change, for example, by broadcasting an updated Bonjour TXT record, and a paired personal device that has previously cached the device record can detect the change by comparing the broadcast values of the state number with the cached value.

The secure communication channel established between the devices at block 336 and block 338 can be used to exchange companion link messages. In one embodiment, before companion link messages are exchanged over a companion link, a secure session is established or re-established between the communal device 302 and the personal device 304. In one embodiment, establishing a session includes performing a pair-verify process to verify the pairing between devices. The pair-verify process relies upon a previously established paring relationship between the communal device 302 and the personal device 304. For example, and in one embodiment, establishing a companion link session between devices can require the persistent identifier of the devices, which can be derived from an anonymized identifier that is advertised via the discovery service. However, to derive the persistent identifier based on the advertised information can make use of one or more elements of data that were exchanged during the pairing process between the devices. In one embodiment, the pair-verify process can include the generation of short term public key pairs that are used to encrypt or sign messages exchanged during the verification process, as well as a verification of previously exchanged long-term key pairs that were exchanged during the initial pairing of the devices. The pair-verify process can be performed each time a secure session is established between devices using a companion link connection.

Figure 4A:
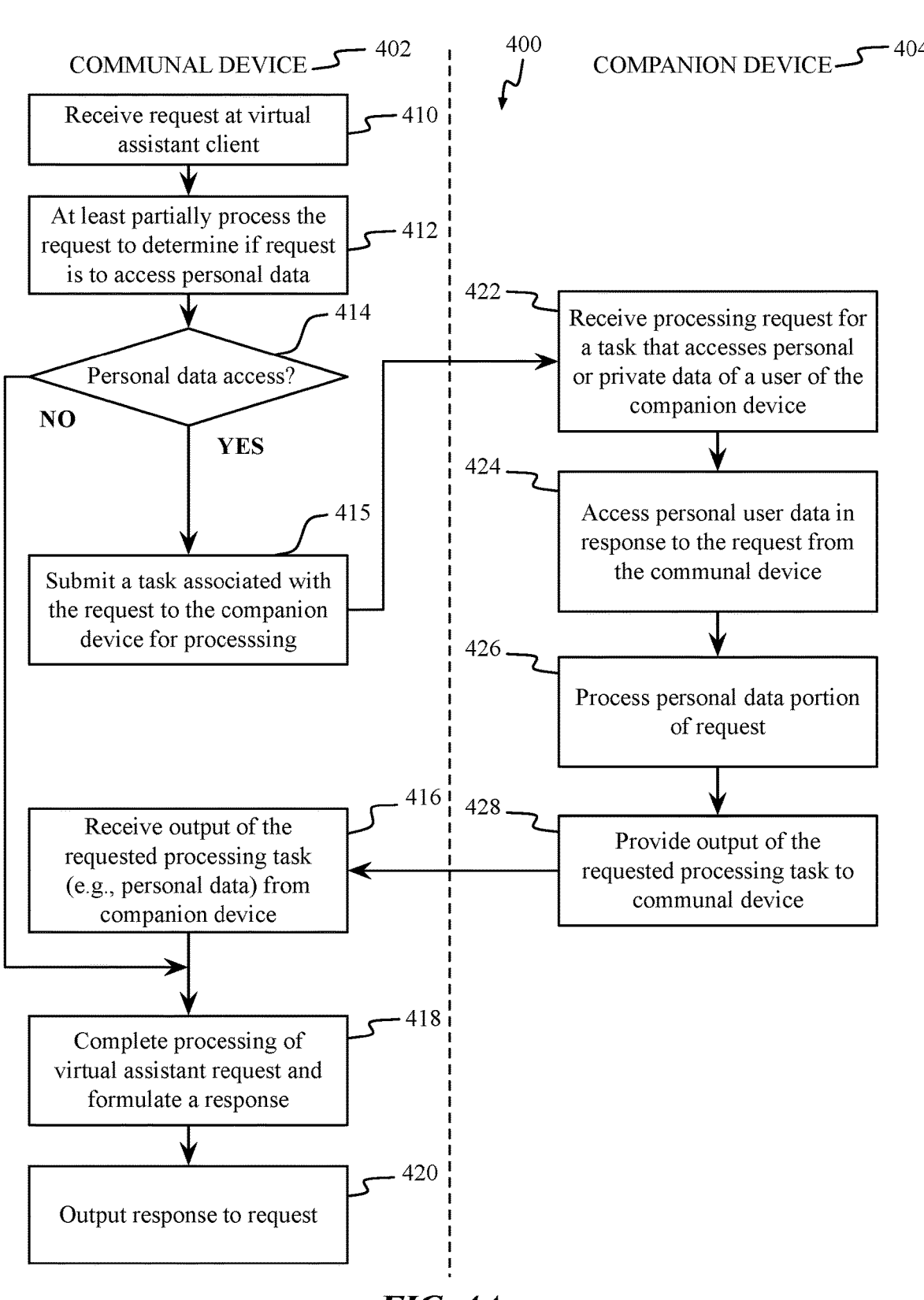
FIG. 4A-4C are flow diagrams of processes to enable a virtual assistant client on a communal device to process queries in a privacy preserving manner.
Figure 4B:
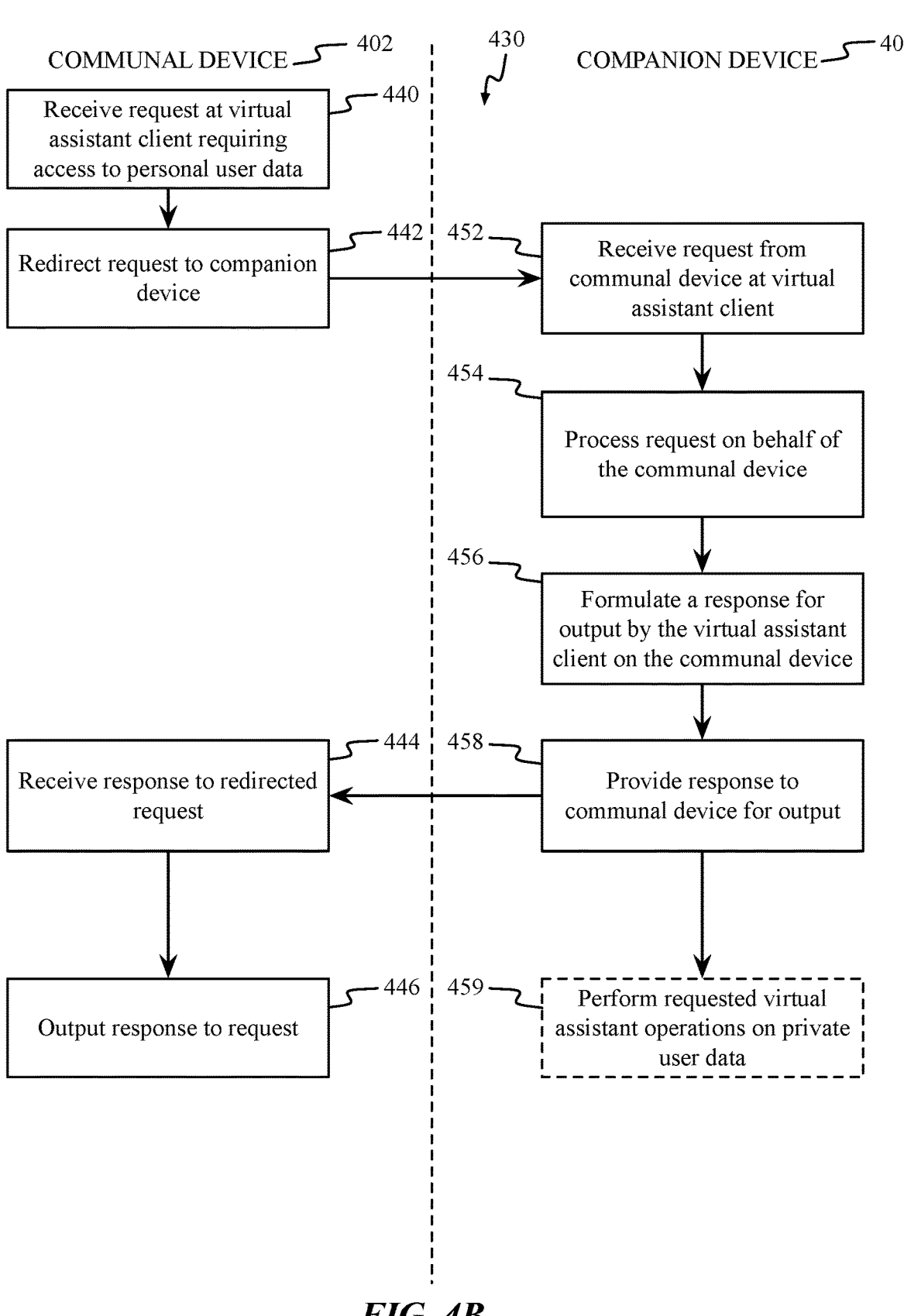
Figure 4C:
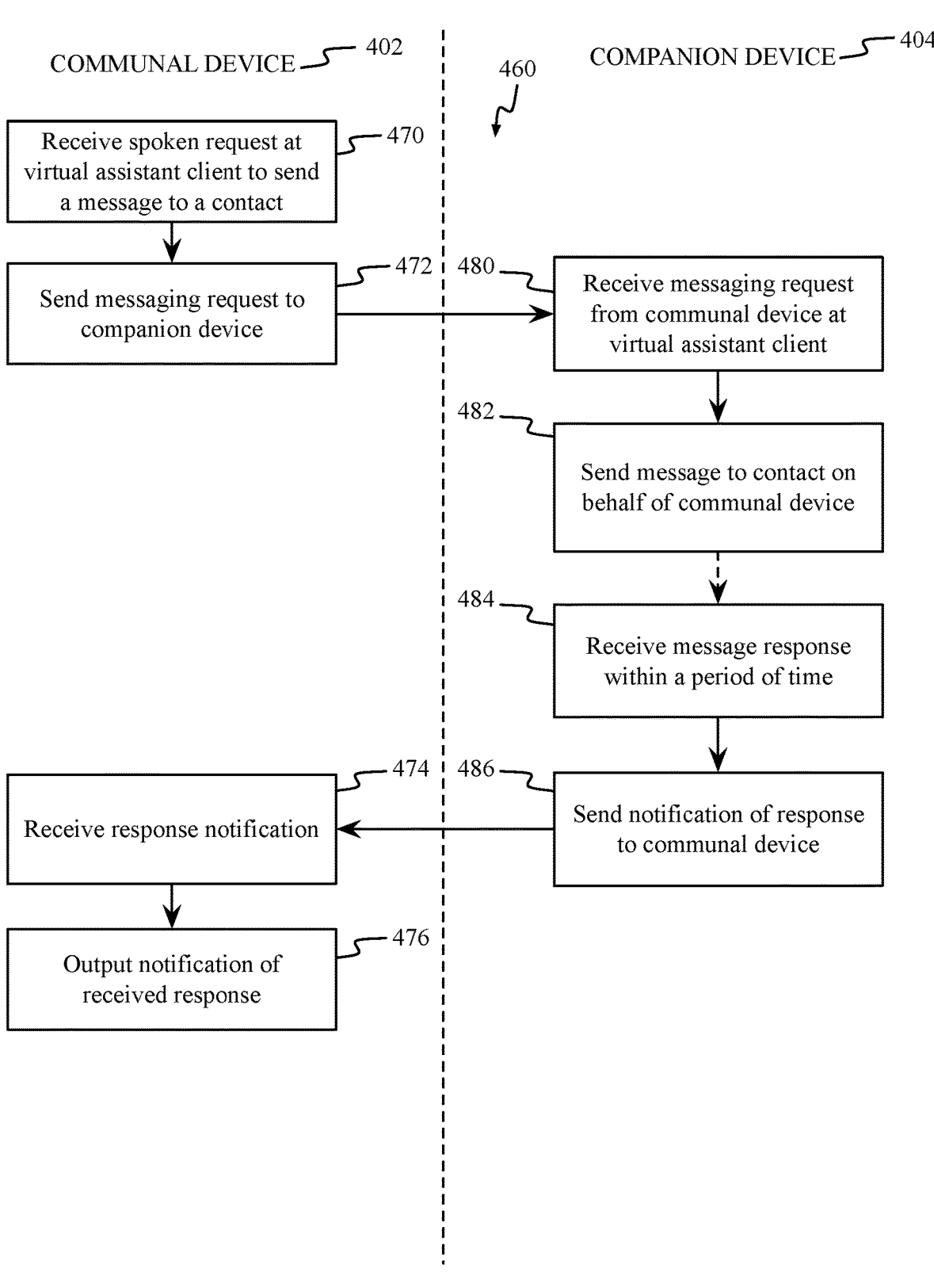

FIG. 4A-4C are flow diagrams of operations of processes 400, 430, 460 to enable a virtual assistant client on a communal device to process queries in a privacy preserving manner. FIG. 4A-4C illustrate operations performed on a communal device 402 and a companion device 404. In various embodiments, the communal device 402 can be a variant of the communal device 302 as in FIG. 3. The companion device 404 can be a personal device 304 as in FIG. 3 that has undergone the pairing process with the communal device 402.

FIG. 4A illustrates a process 400 in which a virtual assistant client on a communal device 402 can connect with a companion device 404 to facilitate the processing of a virtual assistant request that access data that is classified as personal user data, according to some embodiments described herein. FIG. 4B illustrates a process 450 in which a virtual assistant client on a communal device 402 can implicitly redirect a virtual assistant query to a companion device 404, according to some embodiments described herein. FIG. 4C illustrates a process 460 for sending messages to a contact via a spoken request to a communal device, according to some embodiments described herein. The circumstances in which a particular process is used can vary based on policy, configuration, and network state. In one embodiment, the circumstances in which a particular process is selected can be determined based on the type of operation to be performed. For example, a request to read a received message can be performed based on process 400 of FIG. 4A, while a request to send a message (e.g., process 460 of FIG. 4C) can be performed based on process 430 of FIG. 4B.

As shown in FIG. 4A, as communal device 402 can receive a request at a virtual assistant client executing on the communal device, as shown at block 410. At block 412, the communal device 402 can at least partially process the request to determine if the request is to access private data for a user. The request can be a text-based request, or a spoken verbal request that is interpreted via natural language processing. In various embodiments, the natural language processing can be performed partially on the communal device 402, entirely on the communal device, or on a virtual assistant server (e.g., virtual assistant server 106 as in FIG. 1A-1B). After the request is at least partially processed, the communal device 402 (or the virtual assistant server, if the processing is offloaded), can determine whether the request requires access to private data, as shown at block 414.

The determination at block 414 of whether the request makes use of personal user data can be performed after the request has been processed and the intent of the request has been determined. For example, a request for the current weather forecast for the location of the communal device 402 may not require access to data that is classified as personal user data. Such request can be further processed, at least in part, by the communal device 402, which can complete the request processing and formulate a response to the request, as shown at 418.

If the communal device 402 determines at block 414 that further processing of the request will require access to personal user data, the communal device 402 can submit a task associated with a request to the companion device for processing, as shown at block 415. The companion device 404 can receive the processing request at block 422. The task submitted by the communal device 402 at block 415 and received by the companion device at block 422 can be transmitted over a companion link established between the communal device 402 and companion device 404. For example, and in one embodiment, the virtual assistant clients executing on the communal device 402 and the companion device 404 can uses a common companion link message passing application programming interface (API) to exchange data.

In one embodiment, the determination at block 414 of whether the request makes use of personal user data can be performed by a virtual assistant server (e.g., virtual assistant server 106 as in FIG. 1) that is communication with the communal device. The communal device 402 can provide a virtual assistant identifier of the companion device 404 when performing processing operations for the communal device. If the virtual assistant server will require access to private data, the virtual assistant server can contact the companion device 404 on behalf of the communal device 402 using the virtual assistant identifier of the companion device.

At block 424, the companion device 404 can access personal user data in response to the request from the communal device 402. An exemplary request that can be facilitated by the companion device 404 includes a request to access a calendar of a user, for example, to add an event or to query the occurrence of the next calendar event. The companion device 404 can also access data within a user's contacts, for example, to look up contact information for one of the contacts of the user. The companion device 404 can access personal user data stored locally on the device. In one embodiment, the companion device 404 can communicate with one or more servers (e.g., online account server 136 as in FIG. 1B) to access private data that is remotely accessible by the companion device based on online account credentials stored on, or associated with, the companion device. In one embodiment, access to personal user data At block 426, the companion device 404 can process the personal data portion of the request. For example, the companion device 404 can perform a lookup in a set of scheduled tasks or events on a calendar for a user or add a task or event to the calendar for a user. The companion device 404 can also send a text or e-mail message for the user in response to a request received at the communal device 402. For example, the companion device 404 can access calendar data for a user in response to a request to read or write to the set of scheduled tasks or events for a user. The companion device 404 can also access data within a user's contacts, for example, to look up a phone number, e-mail address, or messaging identifier of a contact and send a text or e-mail message to the contact.

Processing the personal data portion of the request can also include interacting with one or more applications on the companion device 404, or one or more underlying frameworks that provide back end services to those one or more applications. In one embodiment, the companion device 404 can provide permission and/or credentials to a virtual assistant server (e.g., virtual assistant server 106 as in FIG. 1A-1B) to enable the virtual assistant server to perform processing tasks on behalf of the companion device 404 using personal user data.

At block 428, the companion device 404 can provide output of the requested processing task to the communal device 402 over the companion link established between the devices. The output provided to the communal device 402 can vary across implementations and/or based on the type of request received at the communal device 402. In one embodiment, the output of the requested processing task can be raw information, such as a time and date of a next calendar event, or another type of specifically requested data. In one embodiment, the output can be a subset of the speech data to be output via the communal device 402, such as speech output that can be integrated into the final output provided by the communal device 402.

At block 416, the communal device 402 can receive the output of the requested processing task from the companion device 404 over the companion link established between devices. In one embodiment, personal data received from the companion device 404 is not persistently stored or cached on the communal device 402 and can discarded after the personal data is used. The communal device 402 can use the personal data to complete the processing of the virtual assistant request and formulate a response to the request at block 418.

In one embodiment, to complete the request processing at block 418 can include a data exchange between the communal device 402 and a virtual assistant server. With additional reference to FIG. 1A, in one embodiment the communal device 402 of FIG. 4A is a smart home device 103 having a virtual assistant client (e.g., VAC 101). The VAC 101 can communicate with the virtual assistant server 106 via the I/O interface to VA client 112. The processing modules 114 can use the data and processing models 116 to determine that the received request is for a local weather forecast for the region of the smart home device. The virtual assistant server 106 can then utilize the I/O interface to external services 118 to access the external services 120 via the one or more networks 110. For example, the external services 120 (e.g., information service(s)) can be accessed to retrieve the requested weather forecast. Information that can be used to formulate a response to the request may be output via the I/O interface to the VA client 112, and the VAC 101 on the smart home device 103 can formulate the response to the request. Alternatively, in some instances the virtual assistant server 106 can formulate a response to the received request and provide the response for output via the I/O interface to VA client 112. The VAC 101 on the smart home device 103 can incorporate the output into a final response.

Returning to FIG. 4A, in one embodiment the communal device 402 can formulate a response to the request received at the virtual assistant client based on public information cached on the communal device, retrieved from a virtual assistant server associated with the communal device 402, or based on personal information received from the companion device 404. Where the output is speech output, the speech output can be generated entirely on the communal device 402 using a text to speech engine local to the communal device 402. In one embodiment, a subset of the speech output can be generated by the companion device 404 and incorporated into the response formulated by the communal device 402.

At block 420 the communal device 402 can output the response to the request. The response can include a spoken component that is output via speakers on the communal device 402. In some embodiments, the output can include a visual component, such as an animation, color change, or other visual indication that may be indicated by the communal device 402. In some implementations, text information or other visual data may be displayed on a display associated with the communal device 402, although some implementations of the communal device 402 may lack a display.

As shown in FIG. 4B, in some embodiments the communal device 402 and companion device 404 can perform a process 430 in which the communal device redirects an incoming virtual assistant client request to the companion device for processing. In one embodiment, the communal device 402 can be configured to appear to have access to personal user data, while implicitly redirecting the processing of the entirety of one or more virtual assistant client requests to the companion device 404. At block 440, the communal device 402 can receive a request at the virtual assistant client of the device that requires access to personal user data. At block 442, the communal device 402 can then redirect the request to the companion device 404 over the companion link established with the companion device. In one embodiment, all or substantially all of the processing of a virtual assistant request can be performed on the companion device 404 in a manner that is transparent to the user of the communal device. The processing of the virtual assistant request on the companion device can also be performed in part on a virtual assistant server as described herein (e.g., virtual assistant server 106 as in FIG. 1A-1B). For example, speech recognition and natural language processing can be performed at least in part by a virtual assistant server.

At block 452, the companion device 404 can receive the request from the communal device at the virtual assistant client executing on the companion device. The companion device 404 can then process the request on behalf of the communal device at block 454 and formulate a response for output by the virtual assistant client on the communal device at block 456. In one embodiment, the processing and response generation on the companion device 404 can be performed as through the request were received directly at the virtual assistant client not be companion device. At block 458, the companion device can then provide the response to the communal device 402 for output. The response provided to the communal device 402, in one embodiment, can include the specific speech output to be delivered by the communal device 402. Alternatively, the provided response can be other data that can be rendered into speech output by the communal device via a speech engine on the communal device.

At block 459, the companion device 404 can perform one or more virtual assistant operations on personal user data should the request include a modification of such data. For example, calendar, alarm, or reminder data for a user can be updated on the companion device based on the request, applications can be opened on the companion device, configuration settings can be adjusted on the companion device, or any other virtual assistant operation can be performed as though the request were received directly by the virtual assistant on the companion device 404. While block 459 is illustrated as being performed after block 478, the requested virtual assistant operations can be performed in any order relative to providing the response to the communal device for output at block 458. For example, a request to open an application can be performed after the audio response acknowledging the request is provided to the communal device for playback. Alternatively, a request to schedule and event or an alarm can be performed before or in parallel with providing the acknowledgment response for output to the communal device.

At block 444, the communal device 402 can receive the response to the redirected request. The communal device 402 can then output the response to the request at block 446. The output of the response can be performed in a manner similar to the output performed at block 420 of FIG. 4A and can include the output of speech data that is generated by the companion device 404 or the output of speech data generated locally on the communal device 402 based on output received from the companion device 404. In the event that the request requires multiple rounds of interaction to complete the requests, multiple rounds of request redirection can be performed between the communal device 402 and the companion device 404 using the companion link established between the devices.

As shown in FIG. 4C, in some embodiments the communal device 402 and companion device 404 can perform a process 460 in which the communal device redirects a virtual assistant client request to send a message (e.g., text message, e-mail message, or another direct message) to the companion device. The communal device 402 can receive a spoken request at a virtual assistant client on the communal device to send a message to contact. The message can be a text message, e-mail message, or another type of direct message that can be sent between user devices. In various embodiments, the text message can be a short messaging service (SMS) message and/or another type of text-based message, such as a message sent over the iMessage® system provided by Apple Inc. of Cupertino, California Some embodiments enable text messages to be sent over other types of non-SMS text messaging services. In one embodiment, the message can be a recorded voice message. The contact to which the message is to be sent can be a contact listed in a contact list, where the contact list may be considered part of the personal domain of a user. In various embodiments, the communal device 402 can at least partially process the spoken request and can also offload at least a portion of the processing to a virtual assistant server (e.g., virtual assistant server 106 as in FIG. 1), in a manner similar to the operation at block 412 of FIG. 4A. In one embodiment, natural language processing operations on the virtual assistant server can determine whether personal user data will be used to process the spoken request received at block 470. For example, the virtual assistant server can determine that processing the spoken request will access data or services that are within the personal domain of a user, such as contact information for a user and a messaging service associated. Accessing the messaging service for the user can include accessing a messaging service account associated with the user. To facilitate processing of the spoken request received at block 470, the communal device 402 can send a messaging request to the companion device 404 at block 472. At block 480, the companion device 404 can receive the messaging request at the virtual assistant client of the device. In one embodiment, the messaging request can be received at block 482 indirectly from the communal device 402 via a virtual assistant server that processed at portion of the spoken request.

The companion device 404, having received a messaging request, directly or indirectly, from the communal device 402 can process the messaging request via a virtual assistant client on the companion device 404. Processing the messaging request can include sending the message to the identified contact on behalf of the communal device, as shown at block 482. Sending the message on the companion device 404 can include sending a text message via an SMS service, sending a message via an e-mail client, or sending a message via another messaging service or application on the companion device 404. In one embodiment, the type of message to send can be specified within the spoken request received by the communal device 402 at block 470. In one embodiment, sending the message can be facilitated based on an online account of the user, for example, an online account associated with the online account server 136 as in FIG. 1B. For example, the messaging service through which the message is sent to the contact can be a messaging service associated with the online account of the user.

The companion device 404 can receive a response to the message sent at block 484. In one embodiment, as shown at block 484, should the response to the message be receive within a period of time, the companion device 404 can send a notification of the response to the communal device 402 at block 486. The period of time during which a notification will be sent for a received message can be specified within a configuration or policy associated with the virtual assistant system or can be configured based on user settings of preferences associated with the user, the communal device 402, or the companion device 404.

In one embodiment, the companion device 404 will send the notification at block 486 to the communal device 402 from which the messaging request is received. In one embodiment, where the companion device 404 is connected with multiple instances of the communal device 402, the specific communal device to which the notification is sent at block 486 can be determined using one of multiple techniques. One technique, as noted above, is to send the notification to the communal device from which the message request is received. An additional technique is to send the notification to the communal device with which the user most recently interacted. For example, a user can request a first communal device in a first location to send a message to a contact. The user can then move to a second location and interact with a second communal device. Should a response to the message be received within the period of time and the user has most recently interacted with the second communal device, the notification can be sent to the second communal device. An additional technique that can be used is to send the notification to the communal device to which the user is closest. In one embodiment, one or more ranging techniques can be used to periodically determine a range between the companion device 404 and the communal device 402. When a reply to a recently sent message is received, the companion device 404 can send the notification to the communal device 402 to which the companion device, or an associated wearable electronic device, is closest according to the one or more ranging techniques.

At block 476, the communal device 402, having received the response notification at block 474, can output notification of received response at block 476. In one embodiment, output of the notification can be provided via a spoken notification that is played via one or more speaker devices of the communal device 402. In one embodiment, other notification techniques can be used, including a visual notification technique. In one embodiment, a spoken notification can include a text to speech translation of one or more components of the received message, such as a spoken contact name. In one embodiment, the spoken notification can include spoken contents of the received message. In one embodiment, where the received message includes recorded media, the recorded media (e.g., audio, video) associated with the received message can be output. In some embodiments, spoken contents of a received text message or playback of recorded media can be performed only in response to a request provided by a user. In such embodiments, a spoken request to play contents of the response can be transmitted to the companion device, which can process the request according to process 400 as in FIG. 4A or process 430 as in FIG. 4B.

Figure 5:
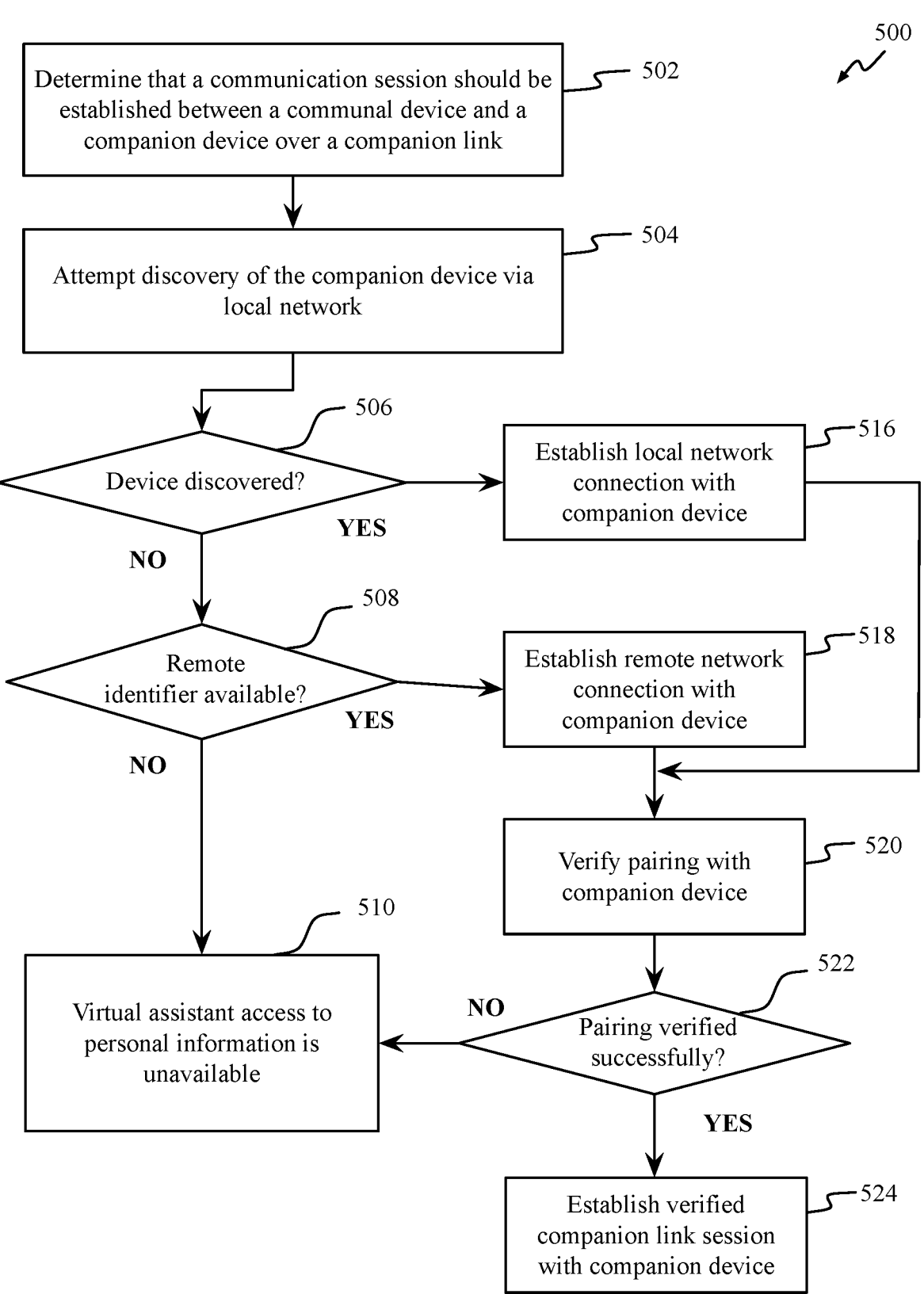
FIG. 5 illustrates a process for establishing a companion link connection with a paired device, according to embodiments described herein.

FIG. 5 illustrates a process 500 for establishing a companion link connection with a paired device, according to embodiments described herein. The process 500 illustrates operations in which a communal device is to initiate a connection with a companion device over the companion link (e.g., communal device 402 and companion device 404 as in FIG. 4). However, similar operations can be performed in which the companion device initiates a connection with a communal device. In one embodiment, during message exchange over the companion link, whichever device initiates the communication session is a client device with respect to the companion link, while the device accepting the session is a server device with respect to the companion link, accordingly, the communal device 402 and companion device 404 may each initiate or accept a companion link connection. Furthermore, in one embodiment a companion link connection can be established between multiple communal devices within a home network environment (e.g., home network environment 200 as in FIG. 2). Additionally, a companion link connection can be established between multiple companion devices, such as between user device 104 and user device 115 as in FIG. 1B.

At block 502, a determination can be made that a communication session should be established between a communal device and a companion device over a companion link. The determination can be made by either the communal device or the companion device. For exemplary purposes, the process 500 is illustrated with the communal device as the client and the companion device as the server, although embodiments are not so limited.

At block 504, the communal device can attempt discovery of the companion device via the local network. The discovery can be performed using a discovery service as described herein, including but not limited to Bonjour or SSDP. If the device is discovered locally at block 506, the process 500 continues at block 516, where the communal device can attempt to establish a local network connection with the companion device. The local network connection can be established via a network protocol such as, but not limited to, the transmission control protocol (TCP). If the device is not discovered locally, the communal device can determine if a remote identifier is available at block 508. The remote identifier can be an identifier or identification token that enables the communal device, or another companion link client, to locate, connect, and established a companion link session with a paired device that does not reside on the same network or is otherwise unable to be discovered via a discovery service protocol. One or more remote identifiers can be exchanged between companion link devices during the presence and reachability information exchange that occurs during a local device discovery and/or pairing process (e.g., discovery process 300 as in FIG. 3). Exemplary remote identifiers include the virtual assistant identifier associated with a virtual assistant client on the companion device, which can be used to communicate via a virtual assistant server (e.g., virtual assistant server 106 as in FIG. 1B); an identifier token established via registration with an online account server (e.g., online account server 136 as in FIG. 1B); and a relay identifier associated with a relay server (e.g., relay server 126 as in FIG. 1B). The communal device can use an available remote identifier to query for a network address, such as an Internet IP address, that can be used to connect to the companion device, or to enable a relayed message exchange with the companion device via a relay service. At block 518, the communal device can use a remote identifier to establish a remote network connection with the companion device.

Whether the connection is established via a local network connection at block 516 or a remote network connection at block 518, the communal device can verify the pairing with the companion device at block 520. Verifying the pairing establishes that a genuine pair relationship exists between the devices commenting over the companion link and makes uses of data exchanged during a previous local pairing. In one embodiment, a pair-verify process is performed in which each device demonstrates possession of a long-term private key corresponding to a long-term public key that was exchanged during pair setup. The pair-verification process can additionally include establishing a new shared secret or session key, which can be used to encrypt communications that occur during a pair-verified session.

At block 522 the companion device can determine whether the pair-verify process was successful. If the pair verification process at block 520 fails to verify a pair relationship between the communal device and the companion device, the companion device will be directed to block 510, in which virtual assistant access to personal information, at least for the user associated with the companion device, will be unavailable.

Virtual assistant access to personal information will also be unavailable if, as determined at block 508, a remote identifier is not available to the communal device to use to access the companion device. Under such circumstances, if given a query that requires access to personal information of a user without a paired and/or valid companion device, the virtual assistant on the communal device will be unable to process the query.

If at block 522 the communal device determines that the pairing has been successfully verified, the communal device can establish a verified companion link session with the companion device to the virtual assistant client on the communal device to service queries that access private data for the user of the companion device at block 524. The verified session can enable end-to-end encrypted message exchange between the devices, such that messages and data can be exchanged between devices in a privacy-preserving manner. The encrypted message exchange can be performed to enable, for example, the relay of commands or responses for a virtual assistant with respect to personal or private user data. The encrypted message exchange can also be performed to synchronize device data between the electronic devices, such as device data, application data, or configuration data associated with a cloud services account.

As indicated above, while process 500 is described an illustrated with a communal device as the device which initiates the connection, the companion device can also initiate a local or remote session with the communal device. In one embodiment, the verified companion link session is a bidirectional connection once established, enabling two-way message exchange between the devices. Furthermore, any mobile devices that participate in the session can enter a wake-on-wireless state when data is not being exchanged over the companion link, such that the device may enter a low power state while the wireless radio and associated processors maintain the connection associated with the session.

In some embodiments, a companion device as described herein can be configured, by default, to restrict access to one or more elements of personal data. In one embodiment, the restriction may be un place on certain elements of personal data until use of the virtual assistant has been enabled on the companion device. In one embodiment, the restriction may be in place on certain elements personal data while the device is in a locked state. In one embodiment, the restriction may be in place until at least one successful unlock authorization has occurred since device power-on. For example, in one embodiment personal data on a user device can be encrypted and access to keys used access such personal data can be restricted while the device is locked. Accordingly, depending on the configuration of the companion device, the companion device may not have access to personal data that would be used to process a request from a communal device should the request be received while the companion device is locked. In one embodiment, access to personal data can be enabled on the companion device using a process illustrated in FIG. 6.

Figure 6:
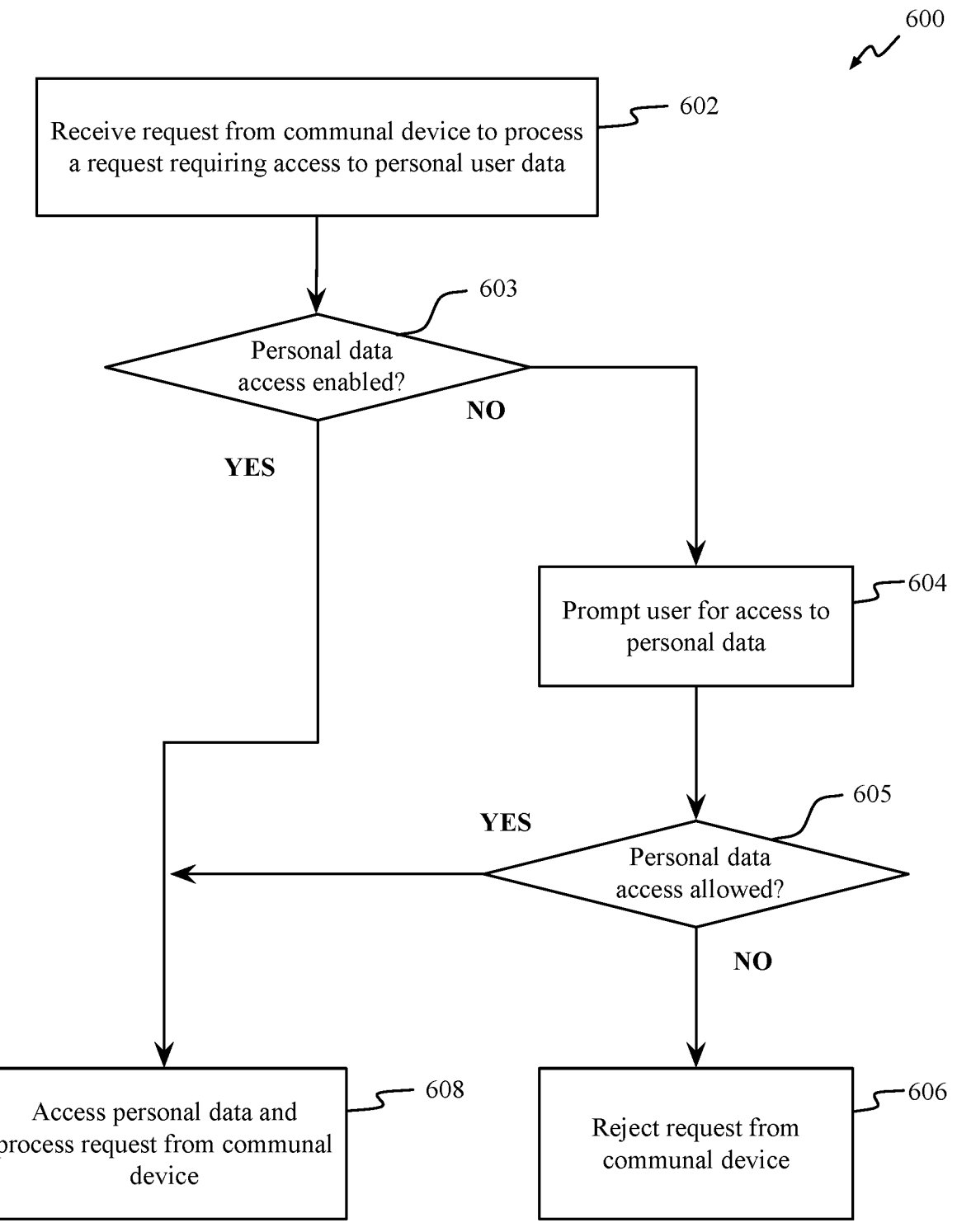
FIG. 6 illustrates a process for allowing access personal data on a companion device, according to embodiments described herein.

FIG. 6 illustrates a process 600 for allowing access personal data on a companion device, according to embodiments described herein. The process 600 can be performed by logic within a companion device as described herein, where the companion device can be any designated personal user device described herein. The companion device can receive a request from a communal device to process a request requiring access to personal user data, as shown at block 602. The companion device can determine whether personal data access is enabled on the personal device. In various embodiments, personal data access on a companion device can be restricted in a variety of ways. In one embodiment, the device can be configured to restrict programmatic access to personal user data while the device is in a locked state. If personal data access is restricted (e.g., not enabled), as determined at block 603, the companion device can prompt the user for access to the personal data, as shown at block 604. The prompt for access to personal data can be a blanket prompt for access or can be specific to the type of personal data to be accessed. In various embodiments, the prompt at block 604 can be presented in various forms. In one embodiment, the prompt is a popup notification or another type of notification presented on a user interface of the companion device. In one embodiment, the prompt is a verbal prompt that can be spoken by the companion device.

If personal data access is allowed by the user at block 605, the companion device can access the personal data and process the request from the communal device at block 608. The manner in which personal data access is allowed by the user can depend on the nature of the access prompt. For example, and in one embodiment, the user can allow access via selection of a presented user interface element or can provide a verbal acknowledgement of the request to the companion device. If the user were to disallow access to the personal data, the companion device can reject the request from the communal device at block 606.

Figure 7:
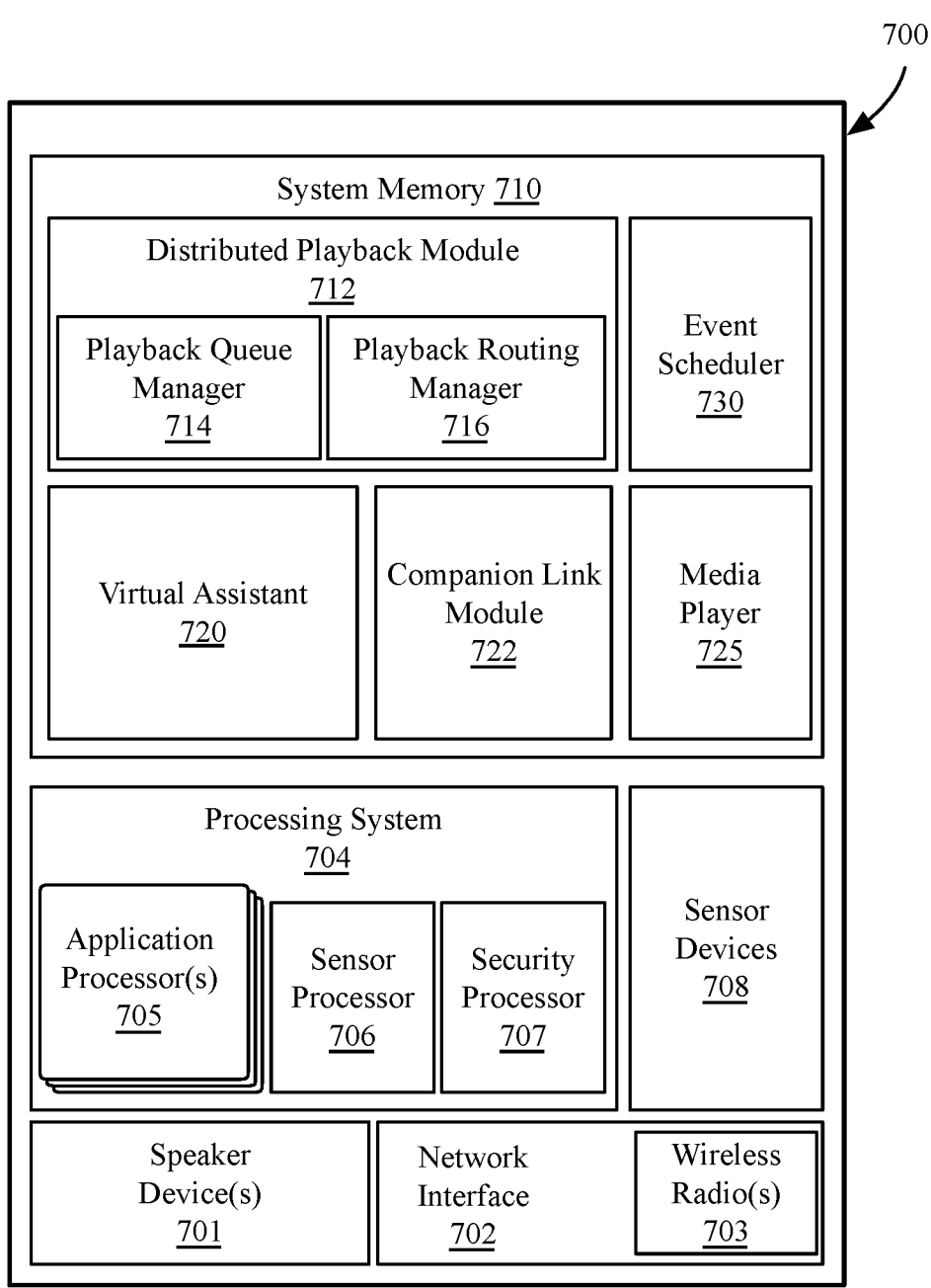
FIG. 7 is a block diagram of a computing device for use within a smart home device, according to an embodiment.

FIG. 7 is a block diagram of a computing device 700 for use a distributed media playback system, according to an embodiment. In one embodiment, the computing device 700 includes hardware and software that may be suitable for use within a user device or a smart home device as described herein, such as a communal smart speaker device or a smart appliance having media playback capability. The computing device 700 includes one or more speaker device(s) 701 to enable media playback. Where the computing device 700 is implemented as a smart speaker device, the speaker device(s) 701 may be of higher quality relative to when the computing device is implemented as a user device or a smart appliance.

The computing device 700 includes a network interface 702 that enables network communication functionality. The network interface 702 can couple with one or more wireless radio(s) 703 to enable wireless communication over one or more wireless networking technologies such as, but not limited to Wi-Fi and Bluetooth. In some implementations, the network interface 702 may also support a wired network connection. The computing device also includes a processing system 704 having multiple processor devices, as well as a system memory 710, which can be a virtual memory system having an address space that includes volatile and non-volatile memory.

In one embodiment, the processing system 704 includes one or more application processor(s) 705 to execute instructions for user and system applications that execute on the computing device. The processing system can also include a sensor processor to process and monitor a suite of sensor devices 708 having sensors including, but not limited to motion sensors, light sensors, proximity sensors, biometric sensors, audio sensors (e.g., microphones), and image sensors (e.g., cameras). The sensor processor 706 can enable low-power monitoring of always-on sensors within the suite of sensor devices 708. The sensor processor 706 can allow the application processor(s) 705 to remain in a low power state when the computing device 700 is not in active use while allowing the computing device 700 to remain accessible via voice or gesture input to a virtual assistant 720. In one embodiment, the sensor processor 706 or a similar low power processor within the processing system can enable low power processing of media instructions provided by a media player 725. The media player 725 may be a modular media player that is capable of playback of a variety of different audio and/or video media types, including but not limited to MPEG-2, MPEG-4, H.264, and H.265/HEVC. In one embodiment, other formats may be supported via additional CODEC plugins.

The virtual assistant 720 is the logic that executes on the computing device 700 to provide the intelligent automated assistant system described herein. The virtual assistant 720 can be selectively given access to various software and hardware components within the computing device, including but not limited to the network interface 702 to retrieve data via a network, media playback applications to initiate or stop playback of media files, or user calendar data to schedule calendar events, tasks, reminders, or alarms. Where the virtual assistant 720 executes on a communal device as described herein, the virtual assistant can interact with a companion link module 722 to locate and connect with a companion device or a virtual assistant executing on the companion device in the event a request is received to access personal domain data of a user.

Where the computing device 700 is within a smart speaker device capable of participating in a distributed playback system, a distributed playback module 712 can perform operations to manage various aspects of media playback, including but not limited to a playback queue manager 714 to manage a list of media to be played via a distributed playback system and a playback routing manager 716 to route media playback to specific elements of the distributed playback system. In one embodiment the playback routing manager 716 can connect with different elements of the distributed playback system via a connection established using the companion link module 722. The companion link module 722 can facilitate connection establishment and message relay over a companion link established between the speakers and devices of the distributed playback system to perform operations such as configuring channel output for a multi-channel playback system or coordinating volume adjustments across multiple connected speakers.

In one embodiment, the event scheduler 730 can exchange data with the distributed playback module 712. The data exchange can be performed in response to input received via a user interface of the computing device 700 or a different computing device that participates within the distributed playback system. The data exchange can also be performed in response to activity requested via the virtual assistant 720. For example, and in one embodiment, an event scheduled via the event scheduler 730 can be associated with a media playlist, such that upon occurrence of the scheduled event, a playlist can be played via the playback queue manager 714. For example, an alarm can be scheduled to wake a user at a specific time. The alarm can be associated with a playlist, such that one or more media elements will be played in association with or as a replacement for an alarm sound. In one embodiment, a playlist can be associated with any event scheduled via the event scheduler 730, including reminder or timer expiration events.

In one embodiment, the playback queue manager 714 can manage multiple simultaneous playback queues, where the playback queues include one or more past, present or future media elements to be played via the computing device 700. The playback queues can be loaded with individual media elements or playlists that specify multiple media elements. The playback queues can include locally stored media, media that will be retrieved for playback via a media server or media that will be streamed from a local or remote media streaming server. Multiple types of media elements may be played over the distributed playback system via the playback queue manager, including multimedia files such, as but not limited to music, music videos, and podcasts, including audio or video podcasts, or audio and/or video clips of current news, weather, or sports events.

Where one or more podcasts are selected for playback in response to the occurrence of a scheduled event, podcast selection logic can select a specific episode of a podcast for playback, such as the latest available episode of a podcast or the latest available unplayed podcast. Such selection can be determined from explicit user preferences or based on learned user preference information. The selection can also be performed based on the age of the available unplayed podcasts relative to the current date. In one embodiment, a podcast feed contains metadata that indicates whether the podcast feed is associated with a serial podcast or a news-style podcast. Whether to play the earliest unplayed episode or the latest episode can be determined at least in part based on such metadata.

In one embodiment, for example when setting a wake alarm, a news program or news channel may be selected for playback. The user may select a specific program or channel for playback in response to the wake alarm. Alternatively, the user can select a generic news category and logic associated with the playback queue manager 714 can select the news program or news channel to play based on selected user preferences. In one embodiment, a news program preference can be determined based on news topic preferences selected in a news program on a user device.

In one embodiment, when an existing playback queue is in effect during a scheduled event that causes playback of a different playback queue, the playback queue manager 714 can manage the queues based on preferences selected by a user. In one instance the playback queue manager 714 can be configured to replace the existing playback queue with the new playback queue, removing the queued items of the existing playback queue and replacing them with the items of the new playback queue. In such instance, the items selected for playback in response to the alarm or other scheduled event replace and subsume the previously queue items. Alternatively, the playback queue manager 714 can be configured to implement a transient playback queue that is in effect only until the scheduled event is dismissed. After the scheduled event is dismissed, the playback items of the previously existing playback queue are restored to the active queue and playback of the previously existing queue can be resumed. The scheduled event can be dismissed via a voice or text command to the virtual assistant, via a user interface on the computing device 700, or a user interface of a user device connected to the computing device 700.

In one embodiment, the playback routing manager 716 can be used to select a playback device within the distributed playback system to use to play a playback queue. Depending on the number of playback devices within the distributed playback system, multiple different queues can be active on multiple different playback devices or multiple different playback devices within the distributed playback system can be grouped. Grouped playback devices can share a common playback queue and simultaneously play the same media. When a smart playback device is provisioned, the playback device can be associated with one or more users and/or one or more user accounts. The smart playback device can also be assigned a location and/or device type. In one embodiment, residential distributed playback network can be configured in which multiple user devices and play media via one or more smart playback devices within a residence. When a smart playback device is added to the residential network, a room or location of each playback device can be specified. An ownership can also be specified for each smart playback device that indicates whether the smart playback device is associated with a single user or if the smart playback device is a communal device that is associated with multiple users.

As described above, one aspect of the present technology is the gathering and use of data available from specific and legitimate sources for use with a virtual assistant, as described herein. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to allow a user to access calendar or reminder data via a virtual assistant. Allowing the virtual assistant to access contact data can enable the virtual assistant to send messages or initiate telephone calls. Further, other uses for personal information data that benefit the user are also contemplated by the present disclosure. For instance, health and fitness data may be used, in accordance with the user's preferences to provide insights into their general wellness or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of communal smart home devices having access to personal data, the present technology can be configured to allow users to select to "opt in" or "opt out" of participation in the collection of personal information data during registration for services or anytime thereafter. In another example, users can select not to enable access to certain elements of personal or private data from a smart home device. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, some smart-home device functionality can be enabled based on aggregated non-personal information data or a bare minimum amount of personal information, such as the content being handled only on the user's device or other non-personal information available.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 8:
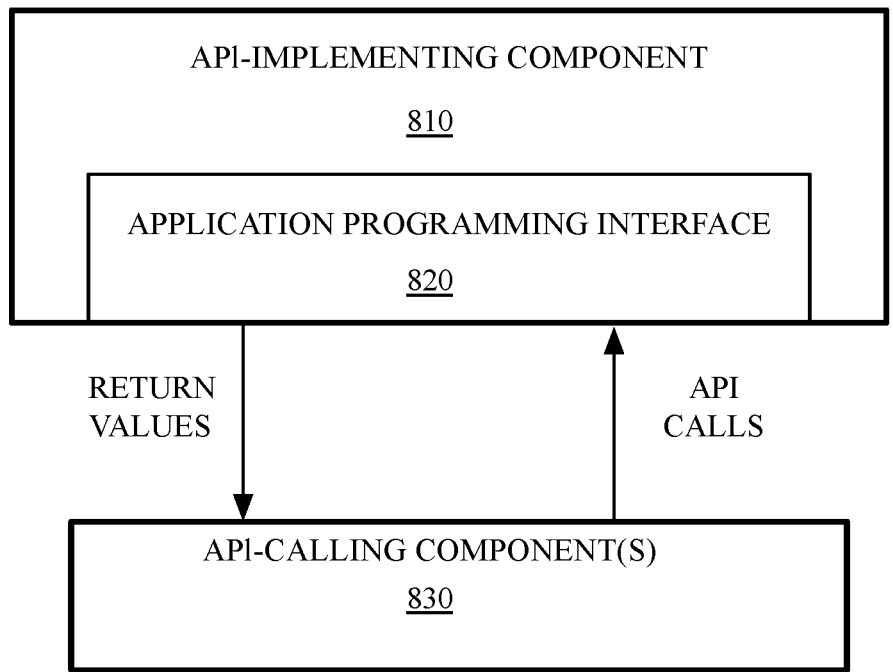
FIG. 8 is a block diagram illustrating an exemplary API architecture, which may be used in some embodiments of the invention.

FIG. 8 is a block diagram illustrating an exemplary API architecture, which may be used in some embodiments of the invention. As shown in FIG. 8, the API architecture 800 includes the API-implementing component 810 (e.g., an operating system, a library, a device driver, an API, an application program, software or other module) that implements the API 820. The API 820 specifies one or more functions, methods, classes, objects, protocols, data structures, formats and/or other features of the API-implementing component that may be used by the API-calling component 830. The API 820 can specify at least one calling convention that specifies how a function in the API-implementing component receives parameters from the API-calling component and how the function returns a result to the API-calling component. The API-calling component 830 (e.g., an operating system, a library, a device driver, an API, an application program, software or other module), makes API calls through the API 820 to access and use the features of the API-implementing component 810 that are specified by the API 820. The API-implementing component 810 may return a value through the API 820 to the API-calling component 830 in response to an API call.

It will be appreciated that the API-implementing component 810 may include additional functions, methods, classes, data structures, and/or other features that are not specified through the API 820 and are not available to the API-calling component 830. It should be understood that the API-calling component 830 may be on the same system as the API-implementing component 810 or may be located remotely and accesses the API-implementing component 810 using the API 820 over a network. While FIG. 8 illustrates a single API-calling component 830 interacting with the API 820, it should be understood that other API-calling components, which may be written in different languages (or the same language) than the API-calling component 830, may use the API 820.

The API-implementing component 810, the API 820, and the API-calling component 830 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 9A:
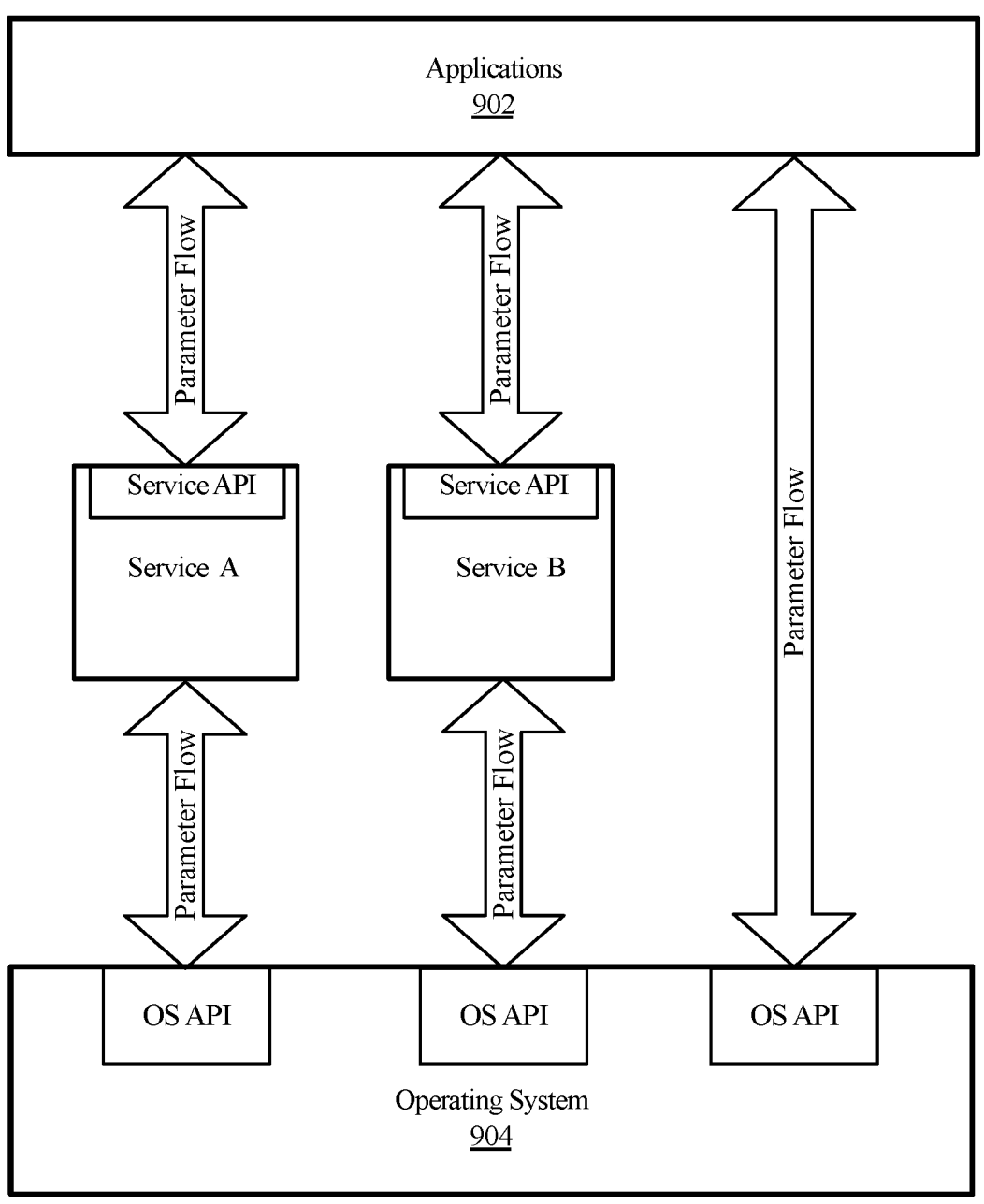
FIG. 9A-9B are block diagrams of exemplary API software stacks, according to embodiments.
Figure 9B:
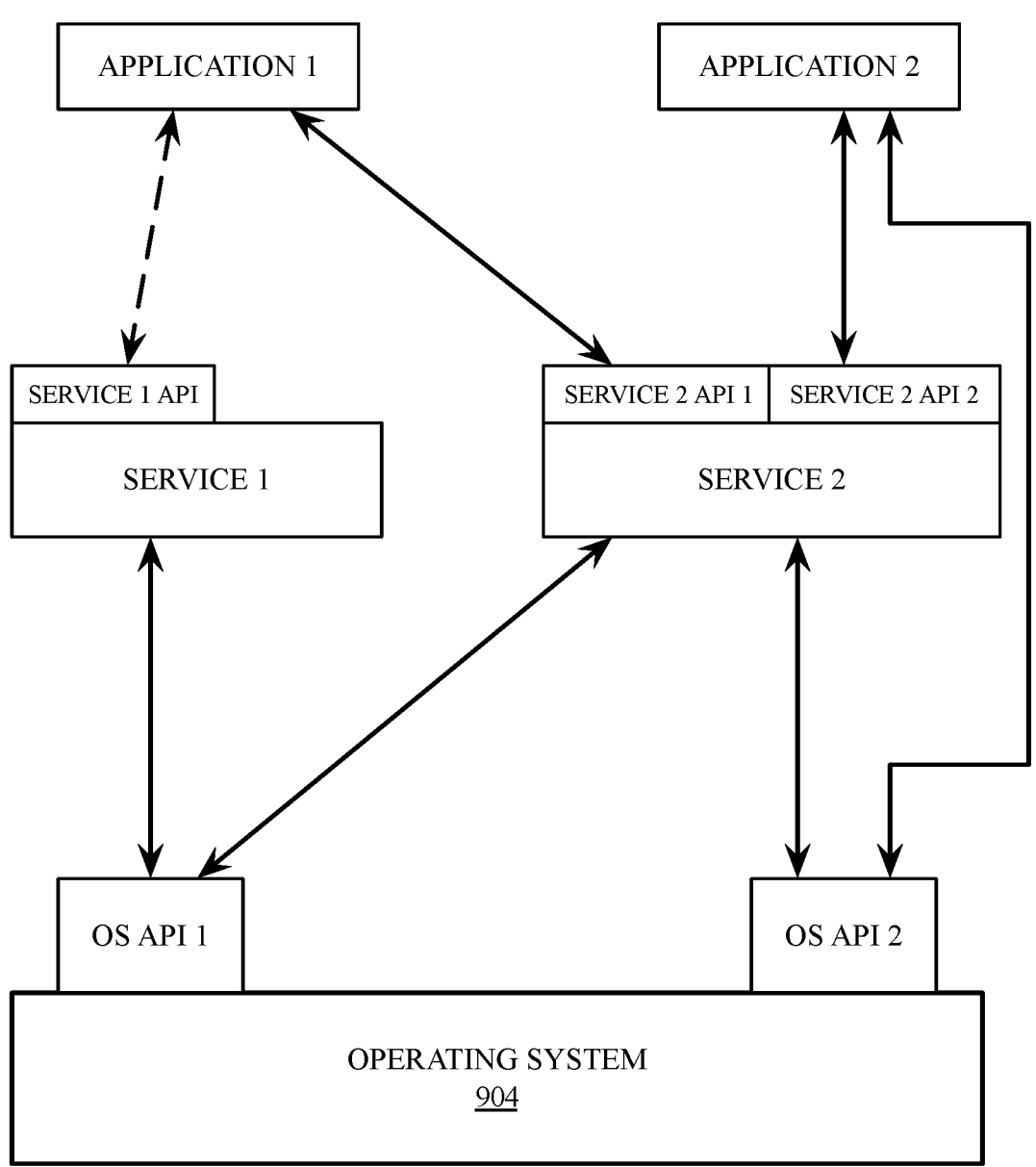

FIG. 9A-9B are block diagrams of exemplary API software stacks 900, 910, according to embodiments. FIG. 9A shows an exemplary API software stack 900 in which applications 902 can make calls to Service A or Service B using Service API and to Operating System 904 using an OS API. Additionally, Service A and Service B can make calls to Operating System 904 using several OS APIs.

FIG. 9B shows an exemplary API software stack 910 including Application 1, Application 2, Service 1, Service 2, and Operating System 904. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Additional Exemplary Computing Devices

Figure 10:
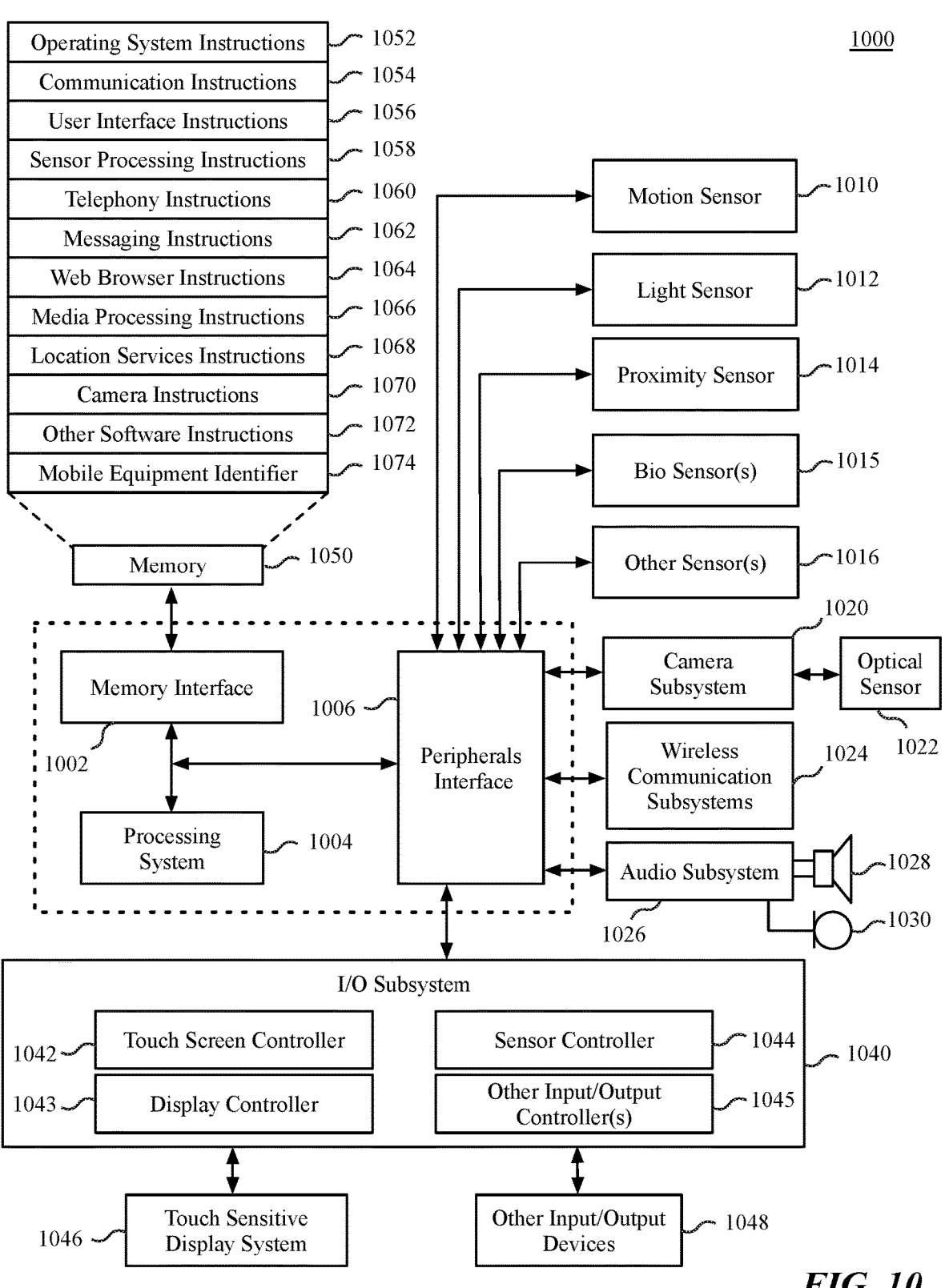
FIG. 10 is a block diagram of mobile device architecture, according to an embodiment.

FIG. 10 is a block diagram of a device architecture 1000 for a mobile or embedded device, according to an embodiment. The device architecture 1000 includes a memory interface 1002, a processing system 1004 including one or more data processors, image processors and/or graphics processing units, and a peripherals interface 1006. The various components can be coupled by one or more communication buses or signal lines. The various components can be separate logical components or devices or can be integrated in one or more integrated circuits, such as in a system on a chip integrated circuit.

The memory interface 1002 can be coupled to memory 1050, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1006 to facilitate multiple functionalities. For example, a motion sensor 1010, a light sensor 1012, and a proximity sensor 1014 can be coupled to the peripherals interface 1006 to facilitate the mobile device functionality. One or more biometric sensor(s) 1015 may also be present, such as a fingerprint scanner for fingerprint recognition or an image sensor for facial recognition. Other sensors 1016 can also be connected to the peripherals interface 1006, such as a positioning system (e.g., GPS receiver), a temperature sensor, or other sensing device, to facilitate related functionalities. A camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1024, which can include radio frequency receivers and transmitters and/ or optical (e.g., infrared) receivers and transmitters. The specific design and implementation of the wireless communication subsystems 1024 can depend on the communication network(s) over which a mobile device is intended to operate. For example, a mobile device including the illustrated device architecture 1000 can include wireless communication subsystems 1024 designed to operate over a GSM network, a CDMA network, an LTE network, a Wi-Fi network, a Bluetooth network, or any other wireless network. In particular, the wireless communication subsystems 1024 can provide a communications mechanism over which a media playback application can retrieve resources from a remote media server or scheduled events from a remote calendar or event server.

An audio subsystem 1026 can be coupled to a speaker 1028 and a microphone 1030 to facilitate voice-enabled functions, such as voice recognition, voice replication, digital recording, and telephony functions. In smart media devices described herein, the audio subsystem 1026 can be a high-quality audio system including support for virtual surround sound.

The I/O subsystem 1040 can include a touch screen controller 1042 and/or other input controller(s) 1045. For computing devices including a display device, the touch screen controller 1042 can be coupled to a touch sensitive display system 1046 (e.g., touch-screen). The touch sensitive display system 1046 and touch screen controller 1042 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1046. Display output for the touch sensitive display system 1046 can be generated by a display controller 1043. In one embodiment, the display controller 1043 can provide frame data to the touch sensitive display system 1046 at a variable frame rate.

In one embodiment, a sensor controller 1044 is included to monitor, control, and/or processes data received from one or more of the motion sensor 1010, light sensor 1012, proximity sensor 1014, or other sensors 1016. The sensor controller 1044 can include logic to interpret sensor data to determine the occurrence of one of more motion events or activities by analysis of the sensor data from the sensors.

In one embodiment, the I/O subsystem 1040 includes other input controller(s) 1045 that can be coupled to other input/control devices 1048, such as one or more buttons, rocker switches, thumb-wheel, infrared port, USB port, and/or a pointer device such as a stylus, or control devices such as an up/down button for volume control of the speaker 1028 and/or the microphone 1030.

In one embodiment, the memory 1050 coupled to the memory interface 1002 can store instructions for an operating system 1052, including portable operating system interface (POSIX) compliant and non-compliant operating system or an embedded operating system. The operating system 1052 may include instructions for handling basic system services and for performing hardware dependent tasks. In some implementations, the operating system 1052 can be a kernel.

The memory 1050 can also store communication instructions 1054 to facilitate communicating with one or more additional devices, one or more computers and/or one or more servers, for example, to retrieve web resources from remote web servers. The memory 1050 can also include user interface instructions 1056, including graphical user interface instructions to facilitate graphic user interface processing.

Additionally, the memory 1050 can store sensor processing instructions 1058 to facilitate sensor-related processing and functions; telephony instructions 1060 to facilitate telephone-related processes and functions; messaging instructions 1062 to facilitate electronic-messaging related processes and functions; web browser instructions 1064 to facilitate web browsing-related processes and functions; media processing instructions 1066 to facilitate media processing-related processes and functions; location services instructions including GPS and/or navigation instructions 1068 and Wi-Fi based location instructions to facilitate location based functionality; camera instructions 1070 to facilitate camera-related processes and functions; and/or other software instructions 1072 to facilitate other processes and functions, e.g., security processes and functions, and processes and functions related to the systems. The memory 1050 may also store other software instructions such as web video instructions to facilitate web video-related processes and functions; and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. A mobile equipment identifier, such as an International Mobile Equipment Identity (IMEI) 1074 or a similar hardware identifier can also be stored in memory 1050.

Each of the above identified instructions and applications can correspond to a set of instructions for performing one or more functions described above. These instructions need not be implemented as separate software programs, procedures, or modules. The memory 1050 can include additional instructions or fewer instructions. Furthermore, various functions may be implemented in hardware and/or in software, including in one or more signal processing and/or application specific integrated circuits.

Figure 11:
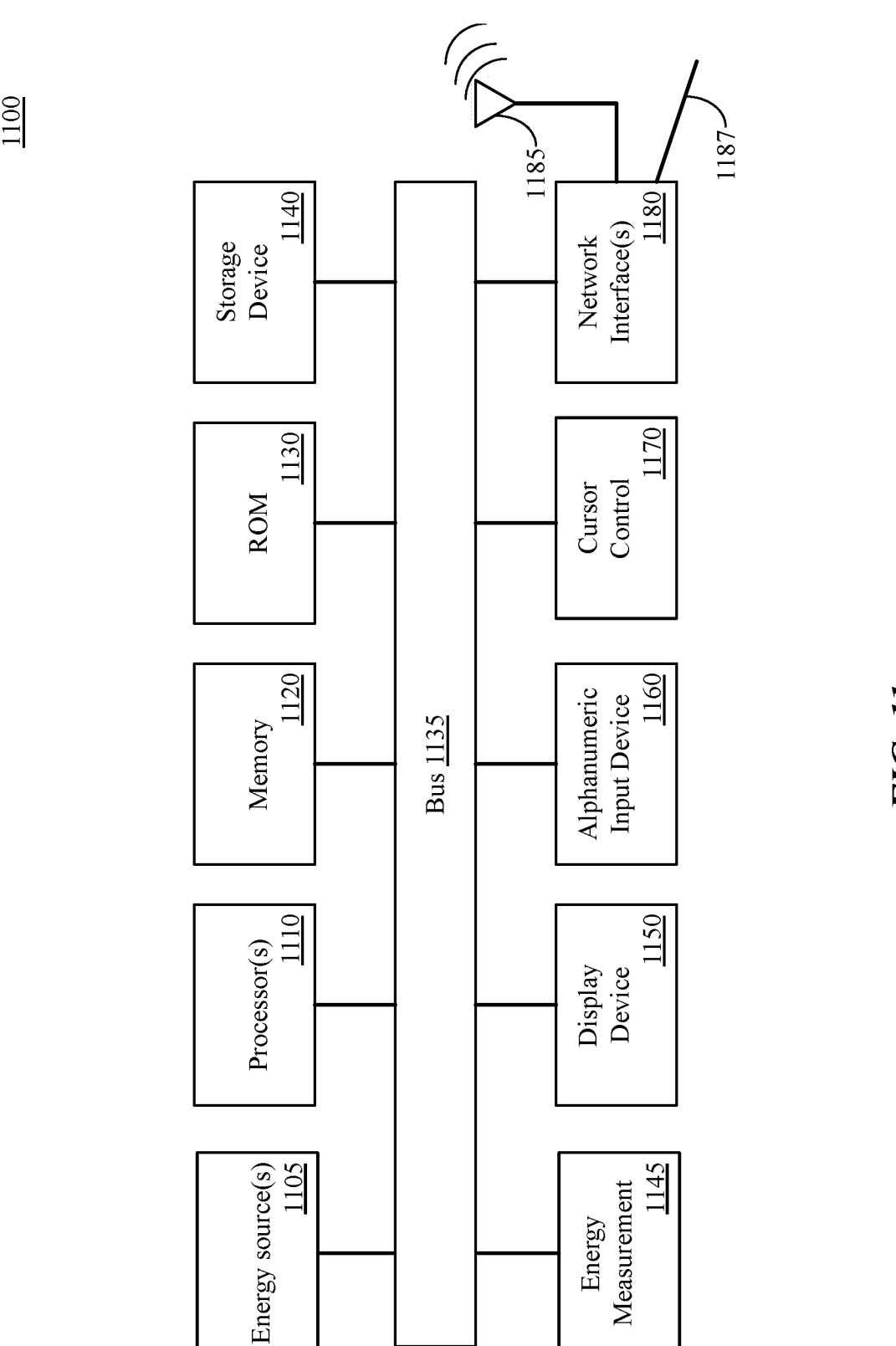
FIG. 11 is a block diagram of a computing system, according to an embodiment.

FIG. 11 is a block diagram of one embodiment of a computing system 1100. The computing system illustrated in FIG. 11 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system of FIG. 11 may be used to provide the computing device and/or a server device to which the computing device may connect.

The computing system 1100 includes bus 1135 or other communication device to communicate information, and processor(s) 1110 coupled to bus 1135 that may process information. While the computing system 1100 is illustrated with a single processor, the computing system 1100 may include multiple processors and/or co-processors. The computing system 1100 further may include memory 1120, such as random-access memory (RAM) or other dynamic storage device coupled to the bus 1135. The memory 1120 may store information and instructions that may be executed by processor(s) 1110. The memory 1120 may also be used to store temporary variables or other intermediate information during execution of instructions by the processor(s) 1110.

The computing system 1100 may also include read only memory (ROM) 1130 and/or another data storage device 1140 coupled to the bus 1135 that may store information and instructions for the processor(s) 1110. The data storage device 1140 can be or include a variety of storage devices, such as a flash memory device, a magnetic disk, or an optical disc and may be coupled to computing system 1100 via the bus 1135 or via a remote peripheral interface.

The computing system 1100 may also be coupled, via the bus 1135, to a display device 1150 to display information to a user. The computing system 1100 can also include an alphanumeric input device 1160, including alphanumeric and other keys, which may be coupled to bus 1135 to communicate information and command selections to processor(s) 1110. Another type of user input device includes a cursor control 1170 device, such as a touchpad, a mouse, a trackball, or cursor direction keys to communicate direction information and command selections to processor(s) 1110 and to control cursor movement on the display device 1150. The computing system 1100 may also receive user input from a remote device that is communicatively coupled via one or more network interface(s) 1180.

The computing system 1100 further may include one or more network interface(s) 1180 to provide access to a network, such as a local area network. The network interface(s) 1180 may include, for example, a wireless network interface having antenna 1185, which may represent one or more antenna(e). The computing system 1100 can include multiple wireless network interfaces such as a combination of Wi-Fi, Bluetooth®, near field communication (NFC), and/or cellular telephony interfaces. The network interface(s) 1180 may also include, for example, a wired network interface to communicate with remote devices via network cable 1187, which may be, for example, an Ethernet cable, a coaxial cable, a fiber optic cable, a serial cable, or a parallel cable.

In one embodiment, the network interface(s) 1180 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1180 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1100 can further include one or more energy sources 1105 and one or more energy measurement systems 1145. Energy sources 1105 can include an AC/DC adapter coupled to an external power source, one or more batteries, one or more charge storage devices, a USB charger, or other energy source. Energy measurement systems include at least one voltage or amperage measuring device that can measure energy consumed by the computing system 1100 during a predetermined period of time. Additionally, one or more energy measurement systems can be included that measure, e.g., energy consumed by a display device, cooling subsystem, Wi-Fi subsystem, or other frequently used or high-energy consumption subsystem.

Figure 12:
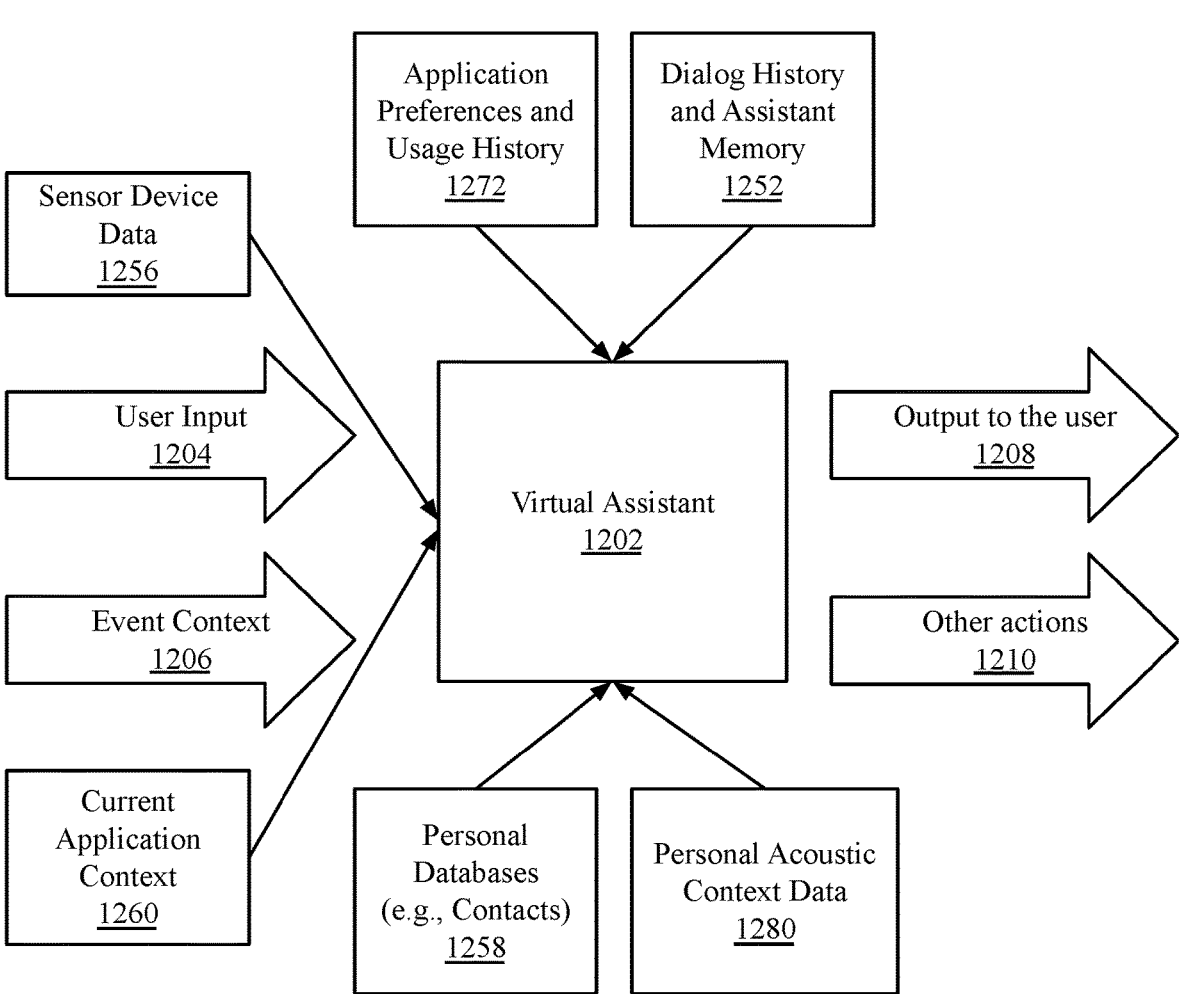
FIG. 12 is a block diagram of a virtual assistant, according to an embodiment.

FIG. 12 illustrates a block diagram of a virtual assistant system 1200, according to embodiments described herein. The illustrated virtual assistant system 1200 is exemplary of one embodiment and is not limiting as to all embodiments described herein. Virtual assistants employed by the various embodiment described herein may include additional, fewer and/or different components or features than those illustrated. The virtual assistant system 1200 includes a virtual assistant 1202 that can accept user input 1204, such as spoken or typed language, processes the input, and generate output 1208 to the user and/or perform 1210 actions on behalf of the user. The virtual assistant 1202 can use context information to supplement natural language or gestural input from a user. Context information can be used to clarify the intent of the user and to reduce the number of candidate interpretations of the user's input. The context information can also reduce the need for the user to provide excessive clarification input. Context can include any available information that is usable by the assistant to supplement explicit user input to constrain an information-processing problem and/or to personalize results. Context can be used to constrain solutions during various phases of processing, including, for example, speech recognition, natural language processing, task flow processing, and dialog generation.

The virtual assistant 1202 can draw on any of a number of different background sources of knowledge and data, such as dictionaries, domain models, and/or task models. From the perspective of the presently described embodiments, such background sources may be internal to the virtual assistant 1202 or can be gathered from one or more remote databases. In addition to user input 1204 and background sources, the virtual assistant 1202 can also draw on information from several sources of context, including, for example, device sensor data 1256, application preferences and usage history 1272, dialog history and assistant memory 1252, personal databases 1258, personal acoustic context data 1280, current application context 1260, and event context 1206.

In one embodiment, a physical device running the virtual assistant 1202, such as a user device, playback device, or smart media playback device as described herein, have one or more sensors devices. Such sensors can provide sources of contextual information in the form of device sensor data 1256. Examples of sensor information include, without limitation, the user's current location; the local time at the user's current location; the position, orientation, and motion of the device on which the user is interacting; the current light level, temperature and other environmental measures; the properties of the microphones and cameras in use; the current networks being used, and signatures of connected networks, including Ethernet, Wi-Fi and Bluetooth. Signatures include MAC addresses of network access points, IP addresses assigned, device identifiers such as Bluetooth names, frequency channels and other properties of wireless networks. Sensors can be of any type including for example: an accelerometer, compass, GPS unit, altitude detector, light sensor, thermometer, barometer, clock, network interface, battery test circuitry, and the like.

The current application context 1260 refers to the application state or similar software state that is relevant to the current activity of the user. For example, the user could be using a text messaging application to chat with a particular person. The Virtual assistant 1202 need not be specific to or part of the user interface of the text messaging application. Instead, the virtual assistant 1202 can receive context from any number of applications, with each application contributing its context to inform the virtual assistant 1202. If the user is currently using an application when the virtual assistant 1202 is invoked, the state of that application can provide useful context information. For example, if virtual assistant 1202 is invoked from within an email application, context information may include sender information, recipient information, date and/or time sent, subject, data extracted from email content, mailbox or folder name, and the like.

In one embodiment, information describing the user's application preferences and usage history 1272 includes preferences and settings for various applications, as well usage history associated with those applications. Application preferences and usage history 1272 is used as context for interpreting and/or operationalizing the user's intent or other functions of the virtual assistant 1202. Examples of such application preferences and usage history 1272 include, without limitation, shortcuts, favorites, bookmarks, friends lists, or any other collections of user data about people, companies, addresses, phone numbers, places, web sites, email messages, or any other references; recent calls made on the device; recent text message conversations, including the parties to the conversations; recent requests for maps or directions; recent web searches and URLs; stocks listed in a stock application; recent songs or video or other media played; the names of alarms set on alerting applications; the names of applications or other digital objects on the device; and the user's preferred language or the language in use at the user's location.

Another source of context data is the personal database 1258 of a user on a device such as a phone, such as for example an address book containing names and phone numbers. In one embodiment, personal information of the user obtained from personal databases 1258 are used as context for interpreting and/or operationalizing the user's intent or other functions of the virtual assistant 1202. For example, data in a user's contact database can be used to reduce ambiguity in interpreting a user's command when the user referred to someone by first name only. Examples of context information that can be obtained from personal databases 1258 include, without limitation, the user's contact database (address book)—including information about names, phone numbers, physical addresses, network addresses, account identifiers, important dates—about people, companies, organizations, places, web sites, and other entities that the user might refer to; the user's own names, preferred pronunciations, addresses, phone numbers, and the like; the user's named relationships, such as mother, father, sister, boss, and the like; the user's calendar data, including calendar events, names of special days, or any other named entries that the user might refer to; the user's reminders or task list, including lists of things to do, remember, or get that the user might refer to; names of songs, genres, playlists, and other data associated with the user's music library that the user might refer to; people, places, categories, tags, labels, or other symbolic names on photos or videos or other media in the user's media library; titles, authors, genres, or other symbolic names in books or other literature in the user's personal library.

Another source of context data is the user's dialog history with the virtual assistant 1202. Such history may include, for example, references to domains, people, places, and so forth. For example, a user can ask "What's the time in New York?". The virtual assistant 1202 can respond by providing the current time in New York City. The user can then ask, "What's the weather?". The virtual assistant 1202 can use the previous dialog history to infer that the location intended for the weather query is the last location mentioned in the dialog history.

Examples of context information from dialog history and virtual assistant memory include, without limitation, people mentioned in a dialog; places and locations mentioned in a dialog; current time frame in focus; current application domain in focus, such as email or calendar; current task in focus, such as reading an email or creating a calendar entry; current domain objects in focus, such as an email message that was just read or calendar entry that was just created; current state of a dialog or transactional flow, such as whether a question is being asked and what possible answers are expected; history of user requests; history of results of user requests, such as sets of restaurants returned; history of phrases used by the assistant in dialog; and facts that were told to the assistant by the user.

In one embodiment, personal acoustic context data 1280 be used to select from possible statistical language models that may be used to understand user speech, or otherwise tune the speech recognition to optimize for recognized acoustical contexts. When interpreting speech input, the virtual assistant 1202 can tune a speech to text service to consider the acoustic environments in which the speech is entered. For example, the noise profiles of a quiet office are different from those of automobiles or public places. If a speech recognition system can identify and store acoustic profile data, these data can also be provided as contextual information. When combined with other contextual information such as the properties of the microphones in use, the current location, and the current dialog state, acoustic context can aid in recognition and interpretation of input.

In the foregoing specification, the invention has been described regarding specific embodiments thereof. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described in accordance with an embodiment.

Embodiments described herein provide a communication mechanism that enables a communal electronic device, such as a smart speaker device or another smart home device, to relay or redirect virtual assistant requests involving personal user data to a companion device, which is a personal user device associated with the user for which access to private data is requested. The communication mechanism can also be used as a general-purpose communication mechanism that enables smart home device to exchange data, including configuration data.

Communication between the communal device and the companion device can be performed on a secure data channel referred to as a companion link. The companion link provides a persistent, low-latency messaging system for connected devices within a home network environment. In some embodiments, the companion link supports the linking of stationary communal devices within a home, such as speaker devices, with personal mobile devices in the home or reachable via the Internet. The companion link enables the communal devices to redirect of personal requests, which the communal device otherwise cannot handle due to privacy concerns, to one or more personal devices. The redirection of the personal requests to a personal device associated with a user can enable a virtual assistant on a communal device to receive and requests in a privacy-preserving manner.

In addition to enabling the redirection of personal queries to companion devices, in one embodiment the companion link also provides a general-purpose messaging system for devices within the home network environment. The general-purpose messaging system enables multiple home devices to work in concert by exchanging messages over the companion link. For example, audio playback between multiple smart speaker devices can be coordinated to enable the devices to perform operations such as, but not limited to coordinating playback of media items, selectively providing audio notifications to a user via the speaker closets to a user, configuring multiple speakers into a multi-channel audio system, or coordinating audio ducking at a speaker during the duration of a spoken request and response.

Communal devices can advertise support for the companion link service over a discovery protocol. Personal user devices on the same network as the communal device can discover the companion link service advertised by the communal device and connect with the communal device using advertised information. The personal device can perform a pairing process with the communal device to become a companion device for a user. In one embodiment, the pairing process includes a proximity element in which the user device exchanges identifiers, keys, or secrets with the companion device over a short-range wireless communication mechanism. The pairing process can also include the exchange of presence and reachability information that can facilitate subsequent connections between communal and companion devices over the companion link.

Embodiments described herein provide a communication mechanism that enables a communal electronic device, such as a smart speaker device or another smart home device, to relay or redirect virtual assistant requests involving personal user data to a personal user device for processing. The communication mechanism can also be used as a general-purpose communication mechanism that enables smart home device to exchange data, including configuration data. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described in accordance with an embodiment.

One embodiment provides a data processing system on a communal electronic device, the data processing system comprising a memory device to store instructions and one or more processors to execute the instructions stored on the memory device. The instructions to cause the one or more processors to provide a virtual assistant to receive commands at the communal electronic device, where the virtual assistant, via the one or more processors, is configured to receive a command at the communal electronic device and determine whether the command is to access personal data of a user associated with the communal electronic device. In response to a determination that the command is to access personal data of the user, the virtual assistant can send a request to a personal electronic device of the user to process at least a portion of the command.

In embodiments described herein, personal data of the user includes a contact list, text message, e-mail, call history, alarm, reminder, communication history, settings, preferences, or location history, and the communal electronic device includes a smart speaker device. The personal data can be stored on the personal electronic device of the user and the virtual assistant can request the personal electronic device to access personal data on behalf of the communal electronic device. The virtual assistant can then receive output of a request sent to the personal electronic device of the user and to complete processing of a command based on the output. The command can be a voice command spoken by a user or a text command transmitted to the communal device. In one embodiment, to send a request to the personal electronic device of the user includes to redirect a command to the personal electronic device of the user, where the personal electronic device is to process the command on behalf of the communal electronic device. The virtual assistant can receive an audio response generated by the personal electronic device and play the audio response as a response to the command. If the command is a command to send a message to a contact of the user, the audio response can be a notification of a received reply to the message.

In one embodiment the communal electronic device can establish a pair and/or trust relationship with the personal electronic device before the communal electronic device is enabled to send the request to the personal electronic device. The virtual assistant can send the request to a personal electronic device of the user over a verified data connection with the personal electronic device. The verified data connection can be established based on the trust relationship with the personal electronic device, where the verified data connection is verified via data exchanged during establishment of the trust relationship. In one embodiment the verified data connection established over a remote data connection established via a wide area network, such as the Internet. Personal data of the user is data that is specific to the user and can include data that is inherently personal or private, or data that is designated as personal or private. Personal data can also include data that can be used to specifically identify the user.

One embodiment provides a non-transitory machine-readable medium storing instruction to cause one or more processors to perform operations comprising determining that a communication session is to be established between a communal electronic device and a companion device, where the companion device is an electronic device having access to personal data associated with a user. The operations additionally include establishing a data connection with the companion device, verifying a trust relationship between the communal electronic device and the companion device, establishing an encrypted communication session between the communal electronic device and the companion device after verifying the trust relationship, and relaying a command received at the communal electronic device to the companion device over the encrypted communication session.

One embodiment provides for an electronic device comprising a network interface to connect to one or more networks and a memory device to store instructions and personal data associated with a user of the electronic device. The electronic device includes one or more processors to execute the instructions stored on the memory device, where the instructions to cause the one or more processors to provide a virtual assistant to receive commands. The virtual assistant, via the one or more processors, can receive, via the network interface, a command redirected from a communal electronic device. The command can include or specify a request to access personal data associated with a user of the electronic device. The virtual assistant can then process at least a portion of the command on behalf of the communal electronic device and transmit, via the network interface, output of processing performed on behalf of the communal electronic device to the communal electronic device.

While a companion link connection is described between a communal electronic device, such as a smart speaker device and a companion device, such as a smartphone device, a companion link connection can also be established between multiple companion devices, such as multiple smartphone devices, table computing devices, or between a smartphone device and a table computing device.

One embodiment provides for a data processing system on an electronic device, the data processing system comprising a memory device to store instructions and one or more processors to execute the instructions stored on the memory device. The instructions, when executed, cause the one or more processors to enable an encrypted data channel between electronic devices. To enable the encrypted data channel, the one or more processors are configured to determine that a communication session is to be established between a first electronic device and a second electronic device, wherein the first electronic device and the second electronic device are each associated with a cloud services account. The one or more processors can be further configured to establish a peer-to-peer data connection between the first electronic device and the second electronic device, verify a trust relationship between the first electronic device and the second electronic device, and establish an encrypted communication session between the first electronic device and the second electronic device after verifying the trust relationship. The encrypted communication session can then be used to exchange data between the first electronic device and the second electronic device over the encrypted communication session.

In a further embodiment, the one or more processors of the data processing system can establish the peer-to-peer data connection over a short-range wireless connection between the first electronic device and the second electronic device and/or establish the encrypted communication session via a network layer protocol over a wireless network connection. To verify the trust relationship between the first electronic device and the second electronic device can include to verify a previously established trust relationship, which can be established via one or more of an exchange of credentials between the first electronic device and the second electronic device over a short-range wireless connection and/or an exchange of credentials via the cloud services account associated with the first electronic device and the second electronic device, the credentials to enable mutual authentication between the first electronic device and the second electronic device.

In a further embodiment, the one or more processors can be configured to determine that the communication session is to be established between the first electronic device and the second electronic device in response to discovering the second electronic device at the first electronic device via a device discovery protocol and establish the peer-to-peer data connection between the first electronic device and the second electronic device after discovering the second electronic device. The communication session can also be established based on a list of devices associated with the cloud services account to which the first device and the second device are associated. In one embodiment the communication session can be established based on a list of devices associated with a family of cloud services accounts, where the first electronic device is associated with a first account, the second electronic device is associated with a second account, and the family of cloud services accounts includes the first account and the second account. In one embodiment, the first electronic device to establish a trust relationship with the second electronic device before the first electronic device is enabled to send a request for a data exchange to the second electronic device.

One embodiment provides for a non-transitory machine-readable medium storing instructions to cause one or more processors to perform operations comprising determining that a communication session is to be established between a first electronic device and a second electronic device, where the first electronic device and the second electronic device are each associated with a cloud services account. The instructions can additionally cause the one or more processors to perform additional operations that include establishing a peer-to-peer data connection between the first electronic device and the second electronic device, verifying a trust relationship between the first electronic device and the second electronic device, establishing an encrypted communication session between the first electronic device and the second electronic device after verifying the trust relationship, and exchanging data between the first electronic device and the second electronic device over the encrypted communication session.

One embodiment provides for a method to be executed on a computing device or data processing system described herein. The method comprises determining that a communication session is to be established between a first electronic device and a second electronic device, where the first electronic device and the second electronic device are each associated with a cloud services account, establishing a peer-to-peer data connection between the first electronic device and the second electronic device via a wireless radio device, and verifying a trust relationship between the first electronic device and the second electronic device, where verifying the trust relationship between the first electronic device and the second electronic device includes verifying a previously established trust relationship. The method additionally includes establishing an encrypted communication session between the first electronic device and the second electronic device via a network layer protocol over a wireless network connection, the encrypted communication session established after verifying the trust relationship and exchanging data between the first electronic device and the second electronic device over the encrypted communication session. The data can be exchanged, for example, to synchronize device data between the first electronic device and the second electronic device, where the device data is associated with the cloud services account.

In a further embodiment, the method additionally comprises determining that a communication session is to be established between the first electronic device and the second electronic device based on a list of devices associated with a family of cloud services accounts, where the first electronic device is associated with a first account, the second electronic device is associated with a second account, and the family of cloud services accounts includes the first account and the second account. The first electronic device can discover the second electronic device via a device discovery protocol and establish the peer-to-peer data connection with the second electronic device after discovering the second electronic device.

Other features of the present embodiments will be apparent from the accompanying drawings and from the detailed description above. Accordingly, the true scope of the invention will become apparent to the skilled practitioner upon a study of the drawings, specification, and following claims.

What is claimed is:

1. A data processing system comprising:
   a memory device to store instructions;
   one or more processors to execute the instructions stored on the memory device, the instructions to cause the one or more processors to enable an encrypted data channel between electronic devices, the one or more processors to:
   receive, from an account server, a list of devices that are registered to a family of associated cloud services accounts, wherein a first electronic device is registered to a first account of the family of associated cloud services accounts, a second electronic device of user is registered to a second account of the family of associated cloud services accounts, the first electronic device and the second electronic device each includes a virtual assistant;
   determine that a communication session is to be established between the first electronic device and the second electronic device based on the list of devices;
   establish a peer-to-peer data connection between the first electronic device and the second electronic device;
   verify a trust relationship between the first electronic device and the second electronic device;
   establish an encrypted communication session between the first electronic device and the second electronic device after verification of the trust relationship; and
   exchange data between the first electronic device and the second electronic device over the encrypted communication session.

2. The data processing system as in claim 1, the one or more processors to establish the peer-to-peer data connection over a direct wireless connection between the first electronic device and the second electronic device.

3. The data processing system as in claim 1, the one or more processors to establish the encrypted communication session via a network layer protocol over a wireless network connection, wherein to establish the encrypted communication session, the first electronic device is to compare a persistent identifier of the first electronic device with a persistent identifier of the second electronic device and initiate the connection with the second electronic device in response to a determination that the persistent identifier of the first electronic device is lower than the persistent identifier of the second electronic device.

4. The data processing system as in claim 1, wherein to verify the trust relationship between the first electronic device and the second electronic device includes to verify a previously established trust relationship.

5. The data processing system as in claim 4, the previously established trust relationship established via one or more of:

an exchange of credentials between the first electronic device and the second electronic device over a short-range wireless connection; and an exchange of credentials via the cloud services account to which the first electronic device and the second electronic device are registered, the credentials to enable mutual authentication between the first electronic device and the second electronic device.

6. The data processing system as in claim 1, the one or more processors additionally to:
   determine that the communication session is to be established between the first electronic device and the second electronic device in response to discovery of the second electronic device at the first electronic device via a device discovery protocol; and
   establish the peer-to-peer data connection between the first electronic device and the second electronic device after discovery of the second electronic device.

7. The data processing system as in claim 1, the one or more processors additionally to:
   discover the second electronic device at the first electronic device via a device discovery protocol;
   establish the peer-to-peer data connection between the first electronic device and the second electronic device after discovering the second electronic device; and
   exchange data between the virtual assistant of the first electronic device and the virtual assistant of the second electronic device via the encrypted communication session.

8. The data processing system as in claim 1, one or more processors additionally to:
   discover the second electronic device at the first electronic device via a device discovery protocol; and
   establish the peer-to-peer data connection between the first electronic device and the second electronic device after discovering the second electronic device.

9. The data processing system as in claim 1, the first electronic device to establish a trust relationship with the second electronic device before the first electronic device is enabled to send a request for a data exchange to the second electronic device.

10. A non-transitory machine-readable medium storing instructions to cause one or more processors to perform operations comprising:
   receiving, from an account server, a list of devices that are registered to a family of cloud services accounts, wherein a first electronic device is registered to a first account of the family of cloud services accounts, or a second electronic device is registered to a second account of the family of cloud services accounts, the first electronic device and the second electronic device each including a virtual assistant;
   determining that a communication session is to be established between the first electronic device and the second electronic device based on the list of devices;
   establishing a peer-to-peer data connection between the first electronic device and the second electronic device;
   verifying a trust relationship between the first electronic device and the second electronic device;
   establishing an encrypted communication session between the first electronic device and the second electronic device after verifying the trust relationship; and
   exchanging data between the first electronic device and the second electronic device over the encrypted communication session.

11. The non-transitory machine-readable medium as in claim 10, the operations additionally comprising establishing the peer-to-peer data connection over a direct wireless connection between the first electronic device and the second electronic device.

12. The non-transitory machine-readable medium as in claim 10, the operations additionally comprising establishing the encrypted communication session via a network layer protocol over a wireless network connection, wherein to establish the encrypted communication session, the first electronic device is to compare a persistent identifier of the first electronic device with a persistent identifier of the second electronic device and initiate the connection with the second electronic device in response to a determination that the persistent identifier of the first electronic device is lower than the persistent identifier of the second electronic device.

13. The non-transitory machine-readable medium as in claim 10, wherein verifying the trust relationship between the first electronic device and the second electronic device includes verifying a previously established trust relationship.

14. The non-transitory machine-readable medium as in claim 13, the previously established trust relationship established via operations including one or more of:

exchanging credentials between the first electronic device and the second electronic device over a short-range wireless connection; and exchanging credentials via the cloud services account to which the first electronic device and the second electronic device are registered, the credentials to enable mutual authentication between the first electronic device and the second electronic device.

15. The non-transitory machine-readable medium as in claim 10, the operations additionally comprising:

determining that the communication session is to be established between the first electronic device and the second electronic device in response to discovery the second electronic device at the first electronic device via a device discovery protocol; and establishing the peer-to-peer data connection between the first electronic device and the second electronic device after discovering the second electronic device.

16. The non-transitory machine-readable medium as in claim 10, the operations additionally comprising:

discovering the second electronic device at the first electronic device via a device discovery protocol;

establishing the peer-to-peer data connection between the first electronic device and the second electronic device after discovering the second electronic device; and exchanging data between the virtual assistant of the first electronic device and the virtual assistant of the second electronic device via the encrypted communication session.

17. The non-transitory machine-readable medium as in claim 10, the operations additionally comprising:

discovering the second electronic device at the first electronic device via a device discovery protocol; and establishing the peer-to-peer data connection between the first electronic device and the second electronic device after discovering the second electronic device.

18. The non-transitory machine-readable medium as in claim 10, the first electronic device to establish a trust relationship with the second electronic device before the first electronic device is enabled to send a request for a data exchange to the second electronic device.

19. A method comprising:

receiving, from an account server a list of devices that are registered to a family of associated cloud services accounts to which at least one of a first electronic device of a user or a second electronic device are registered to a cloud services account of the family of associated cloud services accounts, the first electronic device and the second electronic device each including a virtual assistant, the first electronic device being a communal electronic device associated with a plurality of users;

determining that a communication session is to be established between the first electronic device and the second electronic device based on the list of devices;

establishing a peer-to-peer data connection between the first electronic device and the second electronic device via a wireless radio device;

verifying a trust relationship between the first electronic device and the second electronic device, wherein verifying the trust relationship between the first electronic device and the second electronic device includes verifying a previously established trust relationship;

establishing an encrypted communication session between the first electronic device and the second electronic device via a network layer protocol over a wireless network connection, the encrypted communication session established after verifying the trust relationship; and exchanging data between the first electronic device and the second electronic device over the encrypted communication session to synchronize device data between the first electronic device and the second electronic device, the device data associated with the cloud services account.

20. The method as in claim 19, additionally comprising:

discovering the second electronic device at the first electronic device via a device discovery protocol; and establishing the peer-to-peer data connection between the first electronic device and the second electronic device after discovering the second electronic device.

* * * * *